(12) United States Patent
Cho et al.

(10) Patent No.: US 11,158,290 B2
(45) Date of Patent: Oct. 26, 2021

(54) ELECTRONIC DEVICE AND METHOD OF CONTROLLING THE SAME

(71) Applicant: Samsung Electronics Co., Ltd., Suwon-si (KR)

(72) Inventors: Youngchan Cho, Suwon-si (KR); Sungwook Kwon, Suwon-si (KR); Nanhee Kim, Suwon-si (KR); Byeongcheol Kim, Suwon-si (KR); Seungeun Lee, Suwon-si (KR); Dugjin Han, Suwon-si (KR); Seungnyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/950,288

(22) Filed: Nov. 17, 2020

(65) Prior Publication Data
US 2021/0074242 A1    Mar. 11, 2021

Related U.S. Application Data

(63) Continuation of application No. PCT/KR2020/010913, filed on Aug. 14, 2020.

(30) Foreign Application Priority Data

Aug. 19, 2019  (KR) .......................... 10-2019-0101278
Mar. 16, 2020  (KR) .......................... 10-2020-0032084

(51) Int. Cl.
*G09G 5/14* (2006.01)
*G06F 1/16* (2006.01)
(Continued)

(52) U.S. Cl.
CPC ............. *G09G 5/14* (2013.01); *G06F 1/1616* (2013.01); *G06F 9/448* (2018.02); *G06F 3/0488* (2013.01);
(Continued)

(58) Field of Classification Search
CPC .. G09G 5/14; G09G 2354/00; G09G 2360/12; G06F 1/1616; G06F 9/448
See application file for complete search history.

(56) References Cited

U.S. PATENT DOCUMENTS

2013/0342482 A1* 12/2013 Kim ..................... G06F 3/0488
                                                       345/173
2014/0089833 A1   3/2014 Hwang et al.
(Continued)

FOREIGN PATENT DOCUMENTS

CN           104035704 A    9/2014
KR     10-2014-0039575 A    4/2014
(Continued)

OTHER PUBLICATIONS

International Search Report with Written Opinion dated Nov. 13, 2020; International Appln. No. PCT/KR2020/010913.

*Primary Examiner* — Kevin M Nguyen
(74) *Attorney, Agent, or Firm* — Jefferson IP Law, LLP

(57) ABSTRACT

An electronic device is provided. The electronic device includes at least one display, at least one processor, and at least one memory. The at least one memory may store instructions to, when executed, enable the at least one processor to obtain, through a first display area of the at least one display activated while the at least one display is folded, an input to select a plurality of applications to be executed and displayed when the at least one display is unfolded, detect an unfolding of the at least one display, based on the detection of the unfolding, split a second display area of the at least one display activated while the at least one display is unfolded to correspond to a number of the plurality of applications, and execute the plurality of applications and display the plurality of applications on the split second display area.

16 Claims, 25 Drawing Sheets

(51) Int. Cl.
　　　*G06F 9/448*　　　(2018.01)
　　　*G06F 3/0488*　　(2013.01)
(52) U.S. Cl.
　　　CPC ..... *G09G 2354/00* (2013.01); *G09G 2360/12* (2013.01)

(56) References Cited

U.S. PATENT DOCUMENTS

| | | |
|---|---|---|
| 2014/0101576 A1 | 4/2014 | Kwak et al. |
| 2014/0164941 A1 | 6/2014 | Kim et al. |
| 2014/0173470 A1* | 6/2014 | Kohashi ................ G06F 3/0486 715/761 |
| 2015/0100914 A1 | 4/2015 | Guan |
| 2015/0338888 A1 | 11/2015 | Kim et al. |
| 2016/0026381 A1* | 1/2016 | Kim ................... G06F 3/04886 715/761 |
| 2017/0242538 A1 | 8/2017 | Chaudhri et al. |
| 2018/0284844 A1* | 10/2018 | Jeune ................... G06F 1/1677 |
| 2020/0233562 A1* | 7/2020 | Itou .................... G06F 3/04842 |

FOREIGN PATENT DOCUMENTS

| | | |
|---|---|---|
| KR | 10-2014-0073371 A | 6/2014 |
| KR | 10-2014-0085039 A | 7/2014 |
| KR | 10-2015-0040246 A | 4/2015 |
| KR | 10-2018-0027467 A | 3/2018 |

\* cited by examiner

ELECTRONIC DEVICE AND METHOD OF CONTROLLING THE SAME

CROSS-REFERENCE TO RELATED APPLICATION(S)

This application is a continuation application, claiming priority under § 365(c), of International Application No. PCT/KR2020/010913 filed on Aug. 14, 2020, which claims priority to Korean Application No. 10-2019-0101278 filed on Aug. 19, 2019, and Korean Application No. 10-2020-0032084 filed on Mar. 16, 2020, the disclosures of which are incorporated by reference herein in their entirety.

BACKGROUND

Technical Field

The disclosure relates to an electronic device and a method of controlling the same. More particularly, the disclosure relates to a method of selecting applications executable on one display.

Description of Related Art

Various electronic devices are commonplace, such as smartphones, tablet personal computers (PCs), portable multimedia players (PMPs), personal digital assistants (PDAs), laptop PCs, and wearable devices.

A diversity of electronic devices recently come with a large screen. For example, foldable or rollable display-equipped electronic devices are being released. As large-screen devices become available, a diversity of modes may be provided to put the broad screen to use. Among such diverse modes, screen split mode, as an example, may mean a mode in which the screen is split into a plurality of areas that display different screens.

In screen split mode, various pieces of information may be provided on the screen in an effective way, and the respective screens of a plurality of applications may be provided on the areas. As such, screen split mode may increase the efficiency of work on the large screen-equipped electronic device.

The above information is presented as background information only to assist with an understanding of the disclosure. No determination has been made, and no assertion is made, as to whether any of the above might be applicable as prior art with regard to the disclosure.

SUMMARY

Various respective aspects and features of the disclosure are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

A static layout configured for executing a plurality of applications on an electronic device with a large screen limits configuring the screen in various manners and deteriorates usability.

Further, when the user splits the screen and runs a plurality of applications, the user displays a certain application in a designated area depending on the properties of the application or the user's preference. In such a case, the user has the hassle of changing the display area for the applications running on the split screens.

Further, in large screen-equipped electronic devices where the screen is foldable, a hardship arises with determining a plurality of applications for use on the large screen.

In accordance with an aspect of the disclosure, an electronic device is provided. The electronic device includes at least one display, at least one processor and at least one memory. The at least one memory stores instructions to, when executed, enable the processor to obtain, through a first display area of the at least one display activated while the at least one display is folded, an input to select a plurality of applications to be executed and displayed when the at least one display is unfolded, detect an unfolding of the at least one display, based on the detection of the unfolding, split a second display area of the at least one display activated while the at least one display is unfolded to correspond to a number of the plurality of applications, and execute the plurality of applications and display the plurality of applications on the split second display area.

In accordance with another aspect of the disclosure, a method of controlling an electronic device is provided. The method includes obtaining, through a first display area of at least one display of the electronic device activated while the at least one display is folded, an input to select a plurality of applications to be executed and displayed when the at least one display is unfolded, detecting an unfolding of the at least one display, based on the detection of the unfolding, split a second display area of the at least one display activated while the at least one display is unfolded to correspond to a number of the plurality of applications, and executing the plurality of applications and displaying the plurality of applications on the split second display area.

In accordance with another aspect of the disclosure, an electronic device is provided. The electronic device includes a display, at least part of the display being folded, at least one processor, and at least one memory. The at least one memory stores instructions to, when executed, enable the at least one processor to obtain an input to select a plurality of applications, in a folded state of the display, store data related to the plurality of applications in a frame buffer included in the at least one memory, based on the input, in the folded state of the display, obtain an event in which the display switches from the folded state to an unfolded state, and display the data stored in the frame buffer, related to the plurality of applications, through the display, based on obtaining the event.

In accordance with another aspect of the disclosure, an electronic device is provided. The electronic device includes at least one display, at least processor, and at least one memory. The memory stores instructions to, when executed, enable the at least one processor to obtain, through a display area activated while the at least one display is folded, an input to determine a layout of a plurality of applications to be executed and displayed when the at least one display is unfolded, obtain, through the display area, an input to select the plurality of applications to be executed and displayed when the at least one display is unfolded, detect an unfolding of the at least one display, and display the plurality of applications on the split display area according to the layout, based on the detection.

Additional aspects will be set forth in part in the description which follows and, in part, will be apparent from the description, or may be learned by practice of the presented embodiments.

An aspect of the disclosure is to provide a method in which an electronic device obtains an input to select at least one or more application execution objects and, when the folded display is unfolded, displays at least one or more selected applications on an area of the display.

Another aspect of the disclosure is to provide a method of determining the position of displaying a plurality of applications according to a user input when an electronic device displays a plurality of applications on the display.

Other various effects are provided directly or indirectly in the disclosure.

It is an aim of certain embodiments of the invention to solve, mitigate or obviate, at least partly, at least one of the problems and/or disadvantages associated with the prior art. Certain embodiments aim to provide at least one of the advantages described below.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
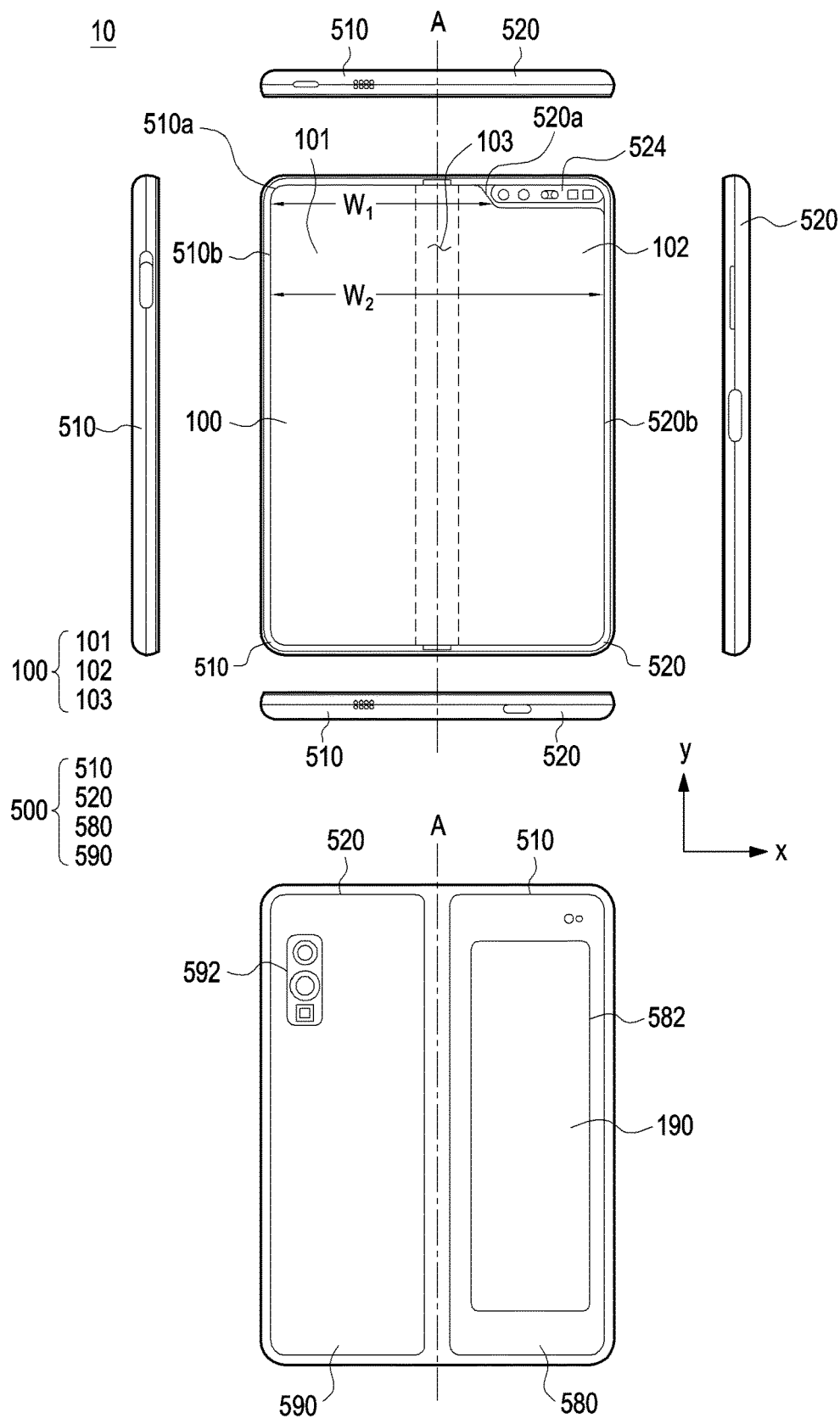
FIG. 1 is a view illustrating an unfolded state of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a view illustrating an unfolded state of an electronic device according to an embodiment of the disclosure.

Figure 2:
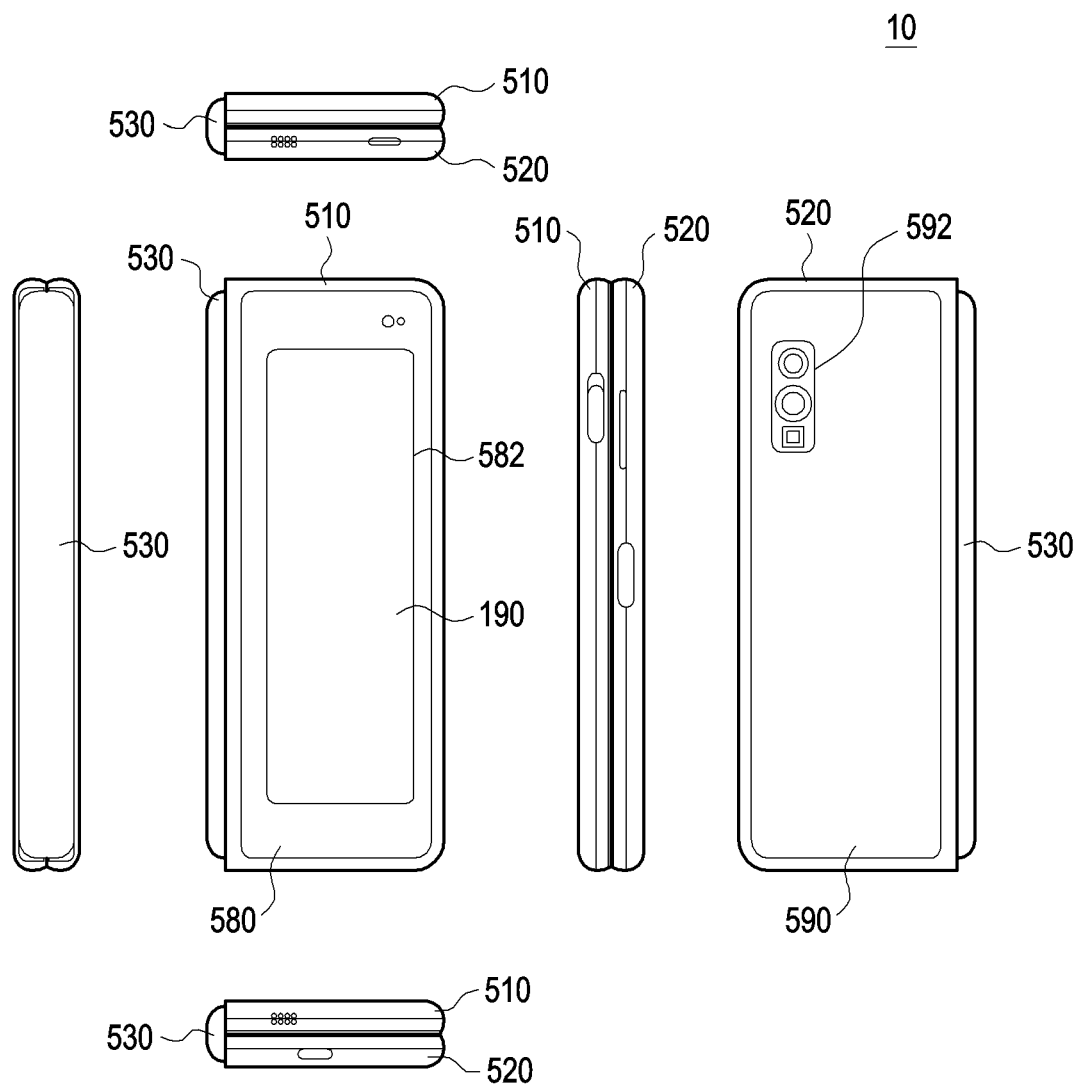
FIG. 2 is a view illustrating a folded state of an electronic device according to an embodiment of the disclosure.

FIG. 2 is a view illustrating a folded state of an electronic device according to an embodiment of the disclosure.

Referring to FIGS. 1 and 2, according to an embodiment of the disclosure, an electronic device 10 may include a foldable housing 500, a hinge cover 530 covering a foldable portion of the foldable housing, and a flexible or foldable display 100 (hereinafter, simply "display 100") disposed in a space formed by the foldable housing 500. In the disclosure, a surface where the display 100 is disposed is defined as a first surface or a front surface of the electronic device 10. The opposite surface of the front surface is defined as a second surface or a back surface of the electronic device 10. The surface surrounding the space between the front and back surfaces is defined as a third surface or a side surface of the electronic device 10.

According to an embodiment of the disclosure, the foldable housing 500 may include a first housing structure 510, a second housing structure 520 including a sensor area 524, a first back cover 580, and a second back cover 590. The foldable housing 500 of the electronic device 10 are not limited to the shape and coupling shown in FIGS. 1 and 2 but may rather be implemented in other shapes or via a combination and/or coupling of other components. For example, in another embodiment of the disclosure, the first housing structure 510 and the first back cover 580 may be integrally formed with each other, and the second housing structure 520 and the second back cover 590 may be integrally formed with each other.

In the illustrated embodiment of the disclosure, the first housing structure 510 and the second housing structure 520 may be positioned on opposite sides of a folding axis (axis A), and they may be overall symmetrical in shape with each other with respect to the folding axis A. As set forth below, the first housing structure 510 and the second housing structure 520 may have different angles or distances formed therebetween depending on whether the electronic device 10 is in an unfolded, folded, or intermediate state. In the illustrated embodiment of the disclosure, the first housing structure 510 and the second housing structure 520 may be symmetrical in shape except that the second housing structure 520 further includes the sensor area 524 where various sensors are arranged, unlike the first housing structure 510.

According to an embodiment of the disclosure, as shown in FIG. 1, the first housing structure 510 and the second housing structure 520 together may form a recess to receive the display 100. In the illustrated embodiment of the disclosure, due to the sensor area 524, the recess may have two or more different widths in the direction perpendicular to the folding axis A.

For example, the recess may have a first width W1 between a first portion 510a, parallel with the folding axis A, of the first housing structure 510, and a first portion 520a, formed at an edge of the sensor area 524, of the second housing structure 520 and a second width W2 formed by a second portion 510b of the first housing structure 510 and a second portion 520b, which is parallel with the folding axis A and does not correspond to the sensor area 524, of the second housing structure 520. In this case, the second width W2 may be longer than the first width W1. In other words, the first portion 510a of the first housing structure 510 and the first portion 520a of the second housing structure 520, which are asymmetrical with each other, may form the first width w1 of the recess, and the second portion 510b of the first housing structure 510 and the second portion 520b of the second housing structure 520, which are symmetrical with each other, may form the second width w2 of the recess. In an embodiment of the disclosure, the first portion 520a and second portion 520b of the second housing structure 520 may have different distances from the folding axis A. The width of the recess is not limited thereto. According to various embodiments of the disclosure, the recess may have a plurality of widths due to the shape of the sensor area 524 or the asymmetric portions of the first housing structure 510 and the second housing structure 520.

In an embodiment of the disclosure, the first housing structure 510 and the second housing structure 520 may at least partially be formed of a metal or non-metallic material with a rigidity selected to support the display 100.

In an embodiment of the disclosure, the sensor area 524 may be formed adjacent to a corner of the second housing structure 520 and to have a predetermined area. However, the placement, shape, or size of the sensor area 524 is not limited to those illustrated. For example, in another embodiment of the disclosure, the sensor area 524 may be provided in a different corner of the second housing structure 520 or in any area between the top corner and the bottom corner. In an embodiment of the disclosure, components for performing various functions, embedded in the electronic device 10, may be exposed through the sensor area 524 or one or more openings in the sensor area 524 to the front surface of the electronic device 10. In various embodiments of the disclosure, the components may include various kinds of sensors. The sensor may include at least one of, e.g., a front-facing camera, a receiver, or a proximity sensor.

The first back cover 580 may be disposed on one side of the folding axis on the back surface of the electronic device 10 and have a substantially rectangular periphery which may be surrounded by the first housing structure 510. Similarly, the second back cover 590 may be disposed on the opposite side of the folding axis on the back surface of the electronic device and its periphery may be surrounded by the second housing structure 520.

In the illustrated embodiment of the disclosure, the first back cover 580 and the second back cover 590 may be substantially symmetrical in shape with respect to the folding axis (axis A). However, the first back cover 580 and the second back cover 590 are not necessarily symmetrical in shape. In another embodiment of the disclosure, the electronic device 10 may include the first back cover 580 and the second back cover 590 in various shapes. In another embodiment of the disclosure, the first back cover 580 may be integrally formed with the first housing structure 510, and the second back cover 590 may be integrally formed with the second housing structure 520.

In an embodiment of the disclosure, a combined structure of the first back cover 580, the second back cover 590, the first housing structure 510, and the second housing structure 520 may form a space where various components (e.g., a printed circuit board or battery) of the electronic device 10 may be disposed. According to an embodiment of the disclosure, one or more components may be arranged or visually exposed on/through the back surface of the electronic device 10. For example, at least a portion of a sub display 190 may be visually exposed through a first back surface area 582 of the first back cover 580. In another embodiment of the disclosure, one or more components or sensors may be visually exposed through a second back surface area 592 of the second back cover 590. According to various embodiments of the disclosure, the sensor may include a proximity sensor and/or a rear-facing camera.

Referring to FIG. 2, the hinge cover 530 may be disposed between the first housing structure 510 and the second housing structure 520 to hide the internal components (e.g., the hinge structure). According to an embodiment of the disclosure, the hinge cover 530 may be hidden by a portion of the first housing structure 510 and second housing structure 520 or be exposed to the outside depending on the state (e.g., the unfolded state or folded state) of the electronic device 10.

For example, as shown in FIG. 1, in the unfolded state of the electronic device 10, the hinge cover 530 may be hidden, and thus not exposed, by the first housing structure 510 and the second housing structure 520. By way of example, as shown in FIG. 2, in the folded state (e.g., the fully folded state) of the electronic device 10, the hinge cover 530 may be exposed to the outside between the first housing structure 510 and the second housing structure 520. As an example, in an intermediate state in which the first housing structure 510 and the second housing structure 520 are folded with a certain angle, the hinge cover 530 may be partially exposed to the outside between the first housing structure 510 and the second housing structure 520. In this case, however, the exposed area may be smaller than in the fully folded state. According to an embodiment of the disclosure, the hinge cover 530 may include a curved surface.

The display 100 may be disposed on a space formed by the foldable housing 500. For example, the display 100 may be seated on a recess formed by the foldable housing 500 and may occupy most of the front surface of the electronic device 10.

Thus, the front surface of the electronic device 10 may include the display 100 and a partial area of the first housing structure 510 and a partial area of the second housing structure 520, which are adjacent to the display 100. The back surface of the electronic device 10 may include the first back cover 580, a partial area of the first housing structure 510, which is adjacent to the first back cover 580, the second back cover 590, and a partial area of the second housing structure 520, which is adjacent to the second back cover 590.

The display 100 may mean a display at least a portion of which may be transformed to be flat or curved. According to an embodiment of the disclosure, the display 100 may include a folding area 103, a first area 101 disposed on one side of the folding area 103 (e.g., the left side of the folding area 103 of FIG. 1), and a second area 102 disposed on the opposite side of the folding area 103 (e.g., the right side of the folding area 103 of FIG. 1).

The segmentation of the display 100 as shown in FIG. 1 is merely an example, and the display 100 may be divided into a plurality of (e.g., four or more, or two) areas depending on the structure or function of the display 100. As an example, in the embodiment illustrated in FIG. 1, the area of the display 100 may be segmented by the folding area 103 or folding axis (axis A) extending in parallel with the y axis but, in another embodiment of the disclosure, the display 100 may also be segmented with respect to another folding area (e.g., a folding area parallel with the x axis) or another folding axis (e.g., a folding axis parallel with the x axis).

The first area 101 and the second area 102 may be overall symmetrical in shape with respect to the folding area 103. However, unlike the first area 101, the second area 102 may include a notch depending on the presence of the sensor area 524, but the rest may be symmetrical in shape with the first area 101. In other words, the first area 131a and the second area 131b may include symmetrical portions and asymmetrical portions.

Described below are the operation of the first housing structure 510 and the second housing structure 520 and each area of the display 100 depending on the state (e.g., the unfolded state (flat state) and folded state) of the electronic device 10.

According to an embodiment of the disclosure, when the electronic device 10 is in the unfolded state (flat state) (e.g., FIG. 1), the first housing structure 510 and the second housing structure 520 may be angled at 180 degrees therebetween, facing in the same direction. The surface of the first area 101 and the surface of the second area 102 of the display 100 may be angled at 180 degrees therebetween while facing in the same direction (e.g., forward of the front surface of the electronic device). The folding area 103 may be coplanar with the first area 101 and the second area 102.

According to an embodiment of the disclosure, when the electronic device 10 is in the folded state (e.g., FIG. 2), the first housing structure 510 and the second housing structure 520 may be disposed to face each other. The surface of the first area 101 and the surface of the second area 102 of the display 100 may be angled at a small angle (e.g., ranging from 0 degrees to 10 degrees) therebetween while facing each other. At least a portion of the folding area 103 may have a curved surface with a predetermined curvature.

According to an embodiment of the disclosure, when the electronic device 10 is in the intermediate state (folded state) (e.g., FIG. 2), the first housing structure 510 and the second housing structure 520 may be disposed at a certain angle therebetween. The surface of the first area 101 of the display 100 and the surface of the second area 102 may form an angle which is larger than the angle in the folded state and smaller than the angle in the unfolded state. The folding area 103 may at least partially have a curved surface with a predetermined curvature and, in this case, the curvature may be smaller than that when it is in the folded state.

According to an embodiment of the disclosure, the folded state of the electronic device 10 may mean a first state of the electronic device 10, and the unfolded state of the electronic device 10 may mean a second state of the electronic device 10.

Figure 3:
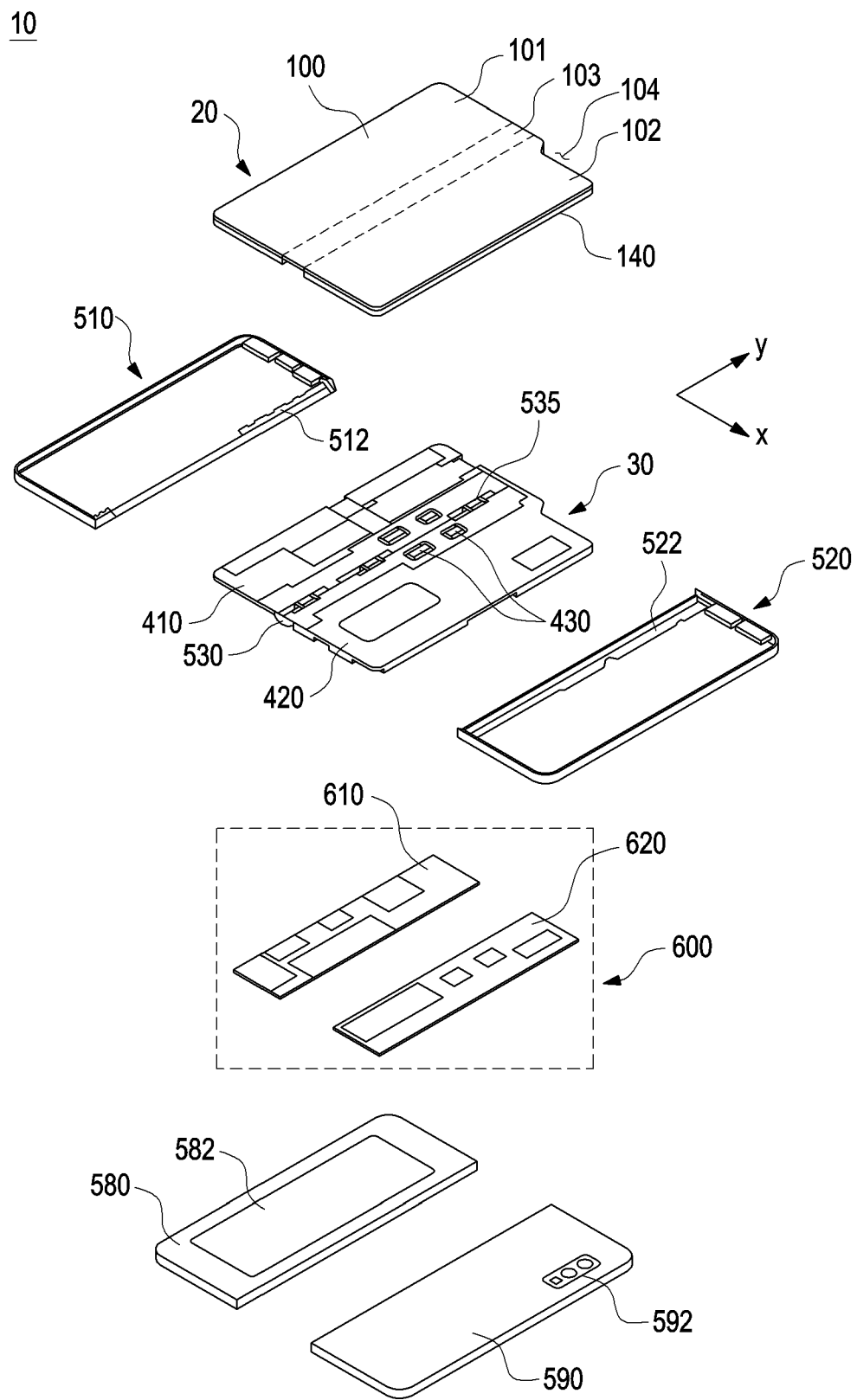
FIG. 3 is an exploded perspective view illustrating an electronic device according to an embodiment of the disclosure.

FIG. 3 is an exploded perspective view illustrating an electronic device according to an embodiment of the disclosure.

Referring to FIG. 3, according to an embodiment of the disclosure, an electronic device 10 may include a display unit 20, a bracket assembly 30, a circuit board unit 600, a first housing structure 510, a second housing structure 520, a first back cover 580, and a second back cover 590. In the disclosure, the display unit 20 may be referred to as a display module or display assembly.

The display unit 20 may include a display 100 and one or more plates or layers 140 on which the display 100 is seated. According to an embodiment of the disclosure, the plate 140 may be disposed between the display 100 and the bracket assembly 30. The display 100 may be disposed on at least a portion of one surface (e.g., an upper surface of FIG. 3) of the plate 140. The plate 140 may be formed in a shape corresponding to the display 100. For example, a portion of the plate 140 may be formed in a shape corresponding to the notch 104 of the display 100.

The bracket assembly 30 may include a first bracket 410, a second bracket 420, a hinge structure 535 disposed between the first bracket 410 and the second bracket 420, a hinge cover 530 covering the hinge structure 535 when the hinge structure 535 is viewed from the outside, and a wiring member 430 (e.g., a flexible printed circuit board (FPCB)) crossing the first bracket 410 and the second bracket 420.

In an embodiment of the disclosure, the bracket assembly 30 may be disposed between the plate 140 and the circuit board unit 600. As an example, the first bracket 410 may be disposed between the first area 101 of the display 100 and a first circuit board 610. The second bracket 420 may be disposed between the second area 102 of the display 100 and a second circuit board 620.

According to an embodiment of the disclosure, the wiring member 430 and the hinge structure 535 may be at least partially disposed inside the bracket assembly 30. The wiring member 430 may be disposed in a direction (e.g., the x-axis direction) crossing the first bracket 410 and the second bracket 420. The wiring member 430 may be disposed in a direction (e.g., the x-axis direction) perpendicular to the folding axis (e.g., the folding axis A of FIG. 1 or the y axis) of the folding area 103.

As mentioned above, the circuit board unit 600 may include the first circuit board 610 disposed on the first bracket 410 and the second circuit board 620 disposed on the second bracket 420. The first circuit board 610 and the second circuit board 620 may be disposed inside a space formed by the bracket assembly 30, the first housing structure 510, the second housing structure 520, the first back cover 580, and the second back cover 590. Components for implementing various functions of the electronic device 10 may be mounted on the first circuit board 610 and the second circuit board 620.

The first housing structure 510 and the second housing structure 520 may be assembled together to be coupled to both sides of the bracket assembly 30, with the display unit 20 coupled to the bracket assembly 30. As described below, the first housing structure 510 and the third housing structure 520 may slide from both sides of the bracket assembly 30 and fit with the bracket assembly 30.

According to an embodiment of the disclosure, the first housing structure 510 may include a first rotation supporting surface 512, and the second housing structure 520 may include a second rotation supporting surface 522 corresponding to the first rotation supporting surface 512. The first rotation supporting surface 512 and the second rotation supporting surface 522 may include a curved surface corresponding to a curved surface included in the hinge cover 530.

According to an embodiment of the disclosure, the first rotation supporting surface 512 and the second rotation supporting surface 522, in the unfolded state of the electronic device 10 (e.g., the electronic device of FIG. 1), may cover the hinge cover 530, allowing the hinge cover 530 to be not or minimally exposed to the back surface of the electronic device 10. The first rotation supporting surface 512 and the second rotation supporting surface 522, in the folded state of the electronic device 10 (e.g., the electronic device of FIG. 2), may rotate along the curved surface included in the hinge cover 530, allowing the hinge cover 530 to be maximally exposed to the back surface of the electronic device 10.

Figure 4:
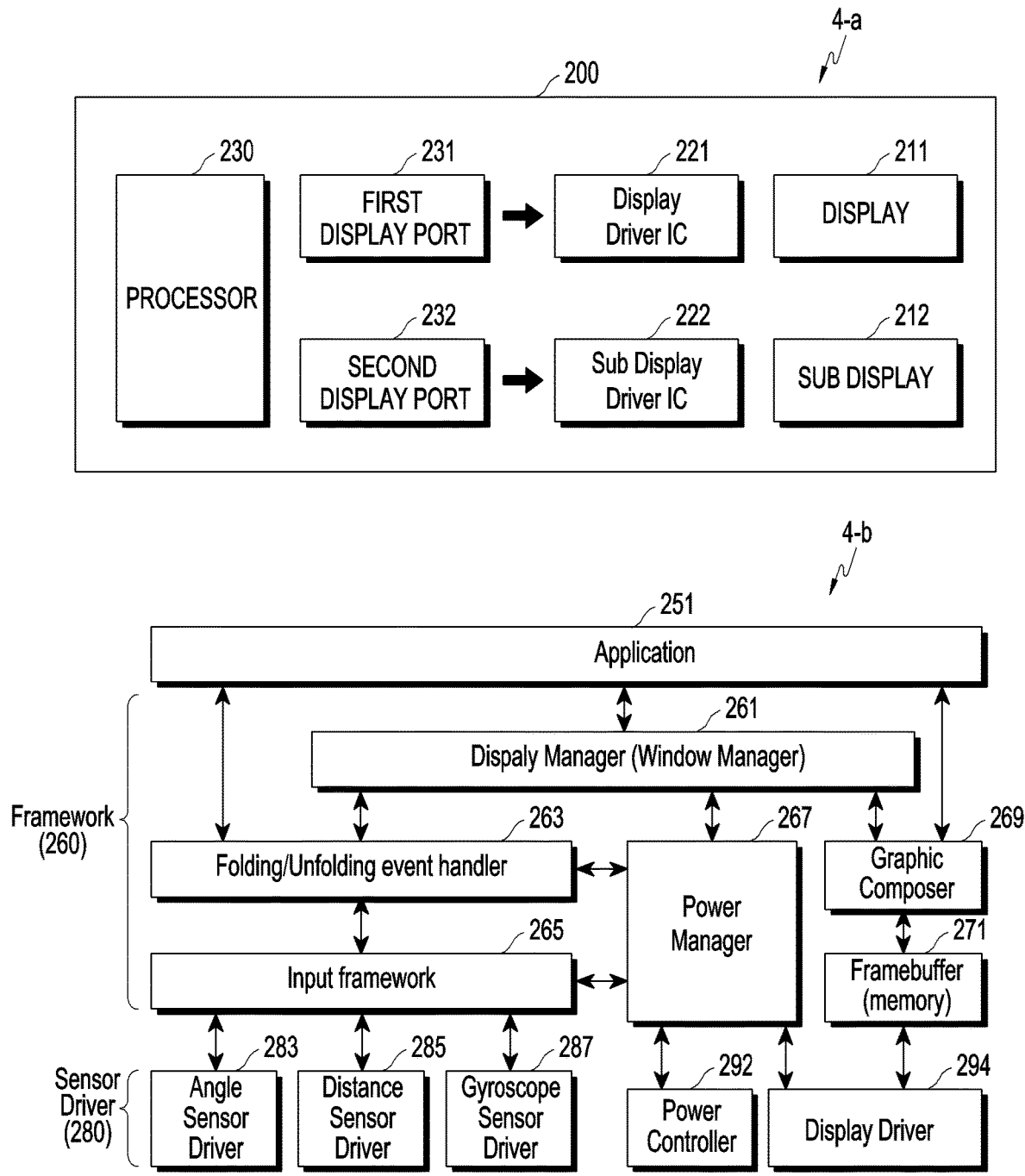
FIG. 4 is a block diagram illustrating an electronic device according to an embodiment of the disclosure.

FIG. 4 is a block diagram illustrating an electronic device according to an embodiment of the disclosure.

Referring to FIG. 4, reference symbol 4-*a* denotes components used when an electronic device according to an embodiment outputs image data.

According to an embodiment of the disclosure, an electronic device 200 may include a display 211, a sub display 212, a display driver integrated circuit (IC) (DDI) 221, a sub DDI 222, or a processor 230. The electronic device 200 may include the electronic device 10 of FIG. 1.

According to an embodiment of the disclosure, the display 211 (e.g., the display 100 of FIG. 1) may be formed on an inner surface of the foldable housing which faces itself when the electronic device 200 is in the folded state. For example, the display 211 may be formed on a first surface of a first housing structure and a third surface of a second housing structure to face itself when the electronic device 200 is in the folded state. For example, the display 211 may extend from the first surface to the third surface, forming the first surface and the third surface.

According to an embodiment of the disclosure, the sub display 212 (e.g., the sub display 190 of FIG. 1) may be exposed through at least a portion of the outer surface of the foldable housing when the electronic device 200 is in the folded state. For example, the sub display 212 may be formed to be seen through at least a portion of a second surface of the first housing structure or a fourth surface of the second housing structure. For example, the sub display 212 may be seen through at least a portion of the second surface or through at least a portion of the fourth surface.

According to an embodiment of the disclosure, the DDI 221 may include an interface module, a memory (e.g., a buffer memory), an image processing module, or a mapping module. The DDI 221 may receive image information that contains, e.g., image data or an image control signal corresponding to a command to control the image data from another component of the electronic device 200 via the interface module. For example, the DDI 221 may receive the image information from the processor 230 or an auxiliary processor (not shown) (e.g., a graphic processing device) operated independently from the function of the processor 230. According to an embodiment of the disclosure, the DDI 221 may communicate with, e.g., touch circuitry or a sensor module via the interface module. According to an embodiment of the disclosure, the DDI 221 may store at least part of the received image information in the memory, for example, on a per-frame basis.

According to an embodiment of the disclosure, the image processing module may perform pre-processing or post-processing (e.g., adjustment of resolution, brightness, or size) with respect to at least part of the image data. According to an embodiment of the disclosure, the pre-processing or post-processing may be performed, for example, based at least in part on one or more characteristics of the image data or one or more characteristics of the display 211.

According to an embodiment of the disclosure, the mapping module may generate a voltage value or a current value corresponding to the image data pre-processed or post-processed by the image processing module. According to an embodiment of the disclosure, the generating of the voltage value or current value may be performed, for example, based at least in part on one or more attributes of the pixels (e.g., an array, such as a red, green, and blue (RGB) stripe or a pentile structure, of the pixels, or the size of each subpixel) of the display 211. At least some pixels of the display 211 may be driven, for example, based at least in part on the voltage value or the current value such that visual information (e.g., a text, an image, or an icon) corresponding to the image data may be displayed via the display 211.

According to an embodiment of the disclosure, the sub DDI 222 may drive the sub display 212 to display images based on image information received from the processor 230. According to an embodiment of the disclosure, the sub DDI 222 may include the same or similar components to the main DDI 221, except that the sub DDI 222 drives the sub display 212. For example, the sub DDI 222 may include an interface module, a memory (e.g., a buffer memory), an image processing module, or a mapping module to perform functions similar to those of the DDI 221.

According to an embodiment of the disclosure, the processor 230 may include a first display port 231 operatively connected with the DDI 221 and a second display port 232 operatively connected with the sub DDI 222. Or, the first display port 231 operatively connected with the DDI 221 and the second display port 232 operatively connected with the sub DDI 222 may be prepared separately from the processor 230.

The processor 230 may transmit first image information to the DDI 221 via the first display port 231 and second image information to the sub DDI 222 via the second display port 232.

According to an embodiment of the disclosure, the first image information and the second image information may be identical to each other. For example, the processor 230 may transmit image information including the same image data to the DDI 221 and the sub DDI 222.

Referring to FIG. 4, reference symbol 4-*b* denotes an illustration of such a context that a program included in an electronic device according to an embodiment identifies a change in the state of the electronic device and outputs on the display.

Referring to reference symbol 4-*b* of FIG. 4, the program may include an application 251, a framework 260, and a sensor driver 280.

According to an embodiment of the disclosure, the application 251 may have a database of at least one or more applications executed on the electronic device 10 and, in response to the user's input, request to execute a specific application.

According to an embodiment of the disclosure, a display manager 261 (or a window manager) may control the state of displays 211 and 212. The display manager 261 (or the window manager) may determine the size, position, or transparency of the window represented on the displays 211 and 212 and execute a drawing control command for the window. The display manager and the window manager may be implemented separately.

According to an embodiment of the disclosure, a power manager 267 may manage all or some of the modules of the electronic device 10 to efficiently adjust current consumption of the electronic device 10. The management of the power status may be achieved by, e.g., voltage or clock frequency control.

According to an embodiment of the disclosure, an input framework 265 may receive various detection values for measuring the unfolded/folded state of the electronic device 10. The input framework 265 may identify detection values obtained from at least one or more sensors, determine the unfolded/folded state of the electronic device 10, and transfer the determined state to the processor 230.

According to an embodiment of the disclosure, a folding/unfolding event handler 263 may receive an unfolding/folding event of the electronic device 10 transferred to the processor 230 and control the ON/OFF of the display 211 and sub display 212 via the power manager 267.

According to an embodiment of the disclosure, a graphic composer 269 may synthesize graphic information for the respective windows of the displays 211 and 212 into a framebuffer 271. The framebuffer 271 may store graphic information to be output to the displays 211 and 212. A sensor driver 280 (e.g., an angle sensor driver 283, a distance sensor driver 285, and a gyroscope sensor driver 287) may be a software module for controlling a sensor integrated circuit (IC).

According to an embodiment of the disclosure, the electronic device 10 may determine a display to be activated in response to a switch of the electronic device 10 from the first state to the second state.

For example, the sensor driver 280 (e.g., at least one or more of the angle sensor driver 283, distance sensor driver 285, and gyroscope sensor driver 287) may transfer detection values to the input framework 265. The input framework 265 may transmit information indicating that the electronic device 10 is in the second state to the folding/unfolding event handler 263 using the obtained detection value.

The folding/unfolding event handler 263 may transfer a request for activating the display 211 and deactivating the sub display 212 to the power manager 267 and the display manager 261, based on, e.g., the state of the application being currently executed, a pre-stored policy corresponding to a change in the state of the electronic device 10, and activation/deactivation allowed state of the displays 211 and 212.

The power manager 267, along with the power controller 292, may control the display driver 294 to activate the display 211 and deactivate the sub display 212 in response to a request obtained from the folding/unfolding event handler 263. The deactivation of the sub display 212 and the activation of the display 211 may be performed sequentially or simultaneously.

According to various embodiments of the disclosure, the activation or deactivation of the displays 211 and 212 may be performed by controlling the current applied to the displays 211 and 212 and the brightness of the light source elements of the displays 211 and 212. The activation or deactivation of the displays 211 and 212 may be performed using both or either of the power manager 267 and the display manager 261.

The display manager 261 may construct and display an image shown in the middle of the displays 211 and 212 switching from the inactive state to active state in response to a request obtained from the folding/unfolding event handler 263, control the position and size of the windows, and then remove the display of the image shown in the middle of the displays 211 and 212 switching from the inactive state to active state, then display the windows on the displays 211 and 212.

Figure 5:
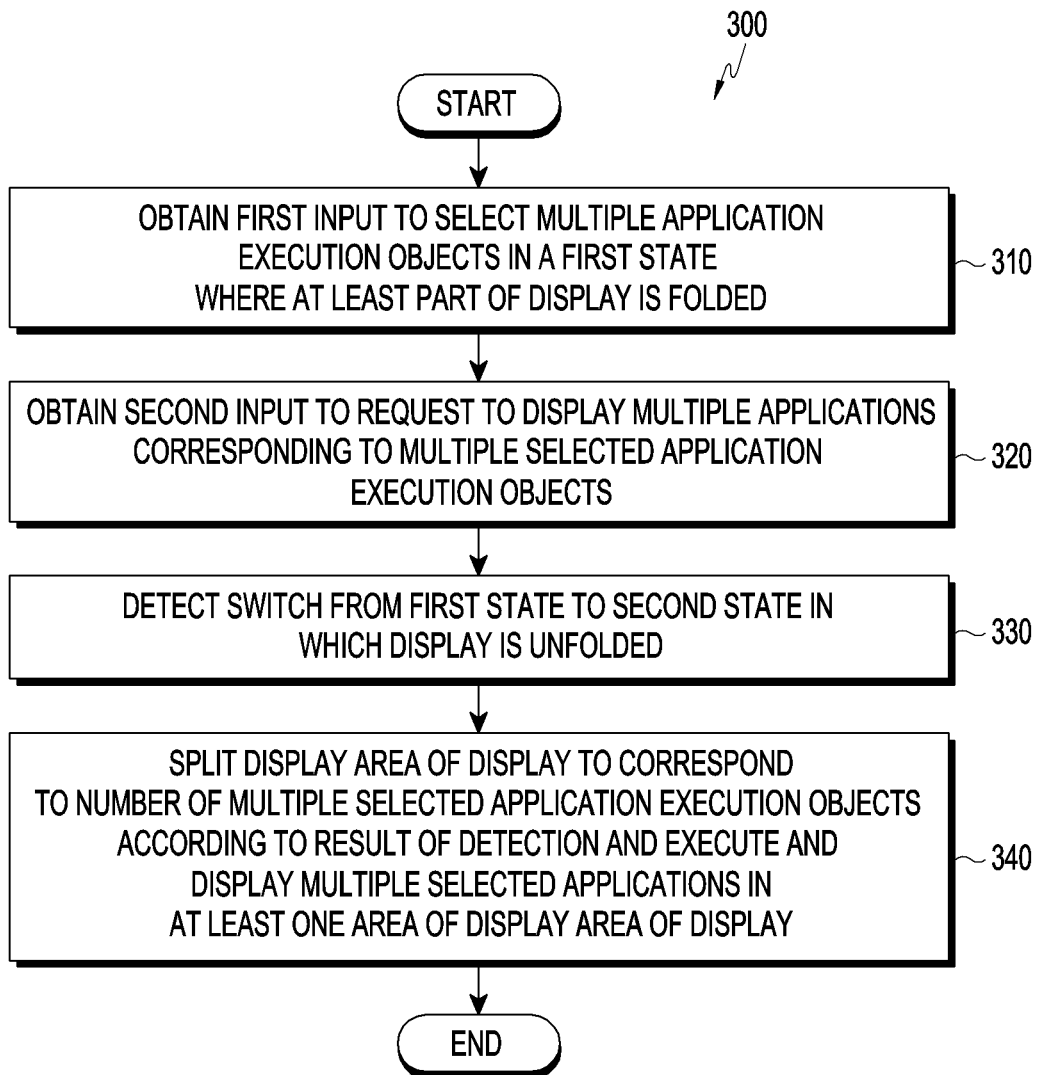
FIG. 5 is a flowchart illustrating a context in which an electronic device simultaneously displays a plurality of applications according to an embodiment of the disclosure.

FIG. 5 is a flowchart 300 illustrating a context in which an electronic device simultaneously displays a plurality of applications according to an embodiment of the disclosure.

Figure 6:
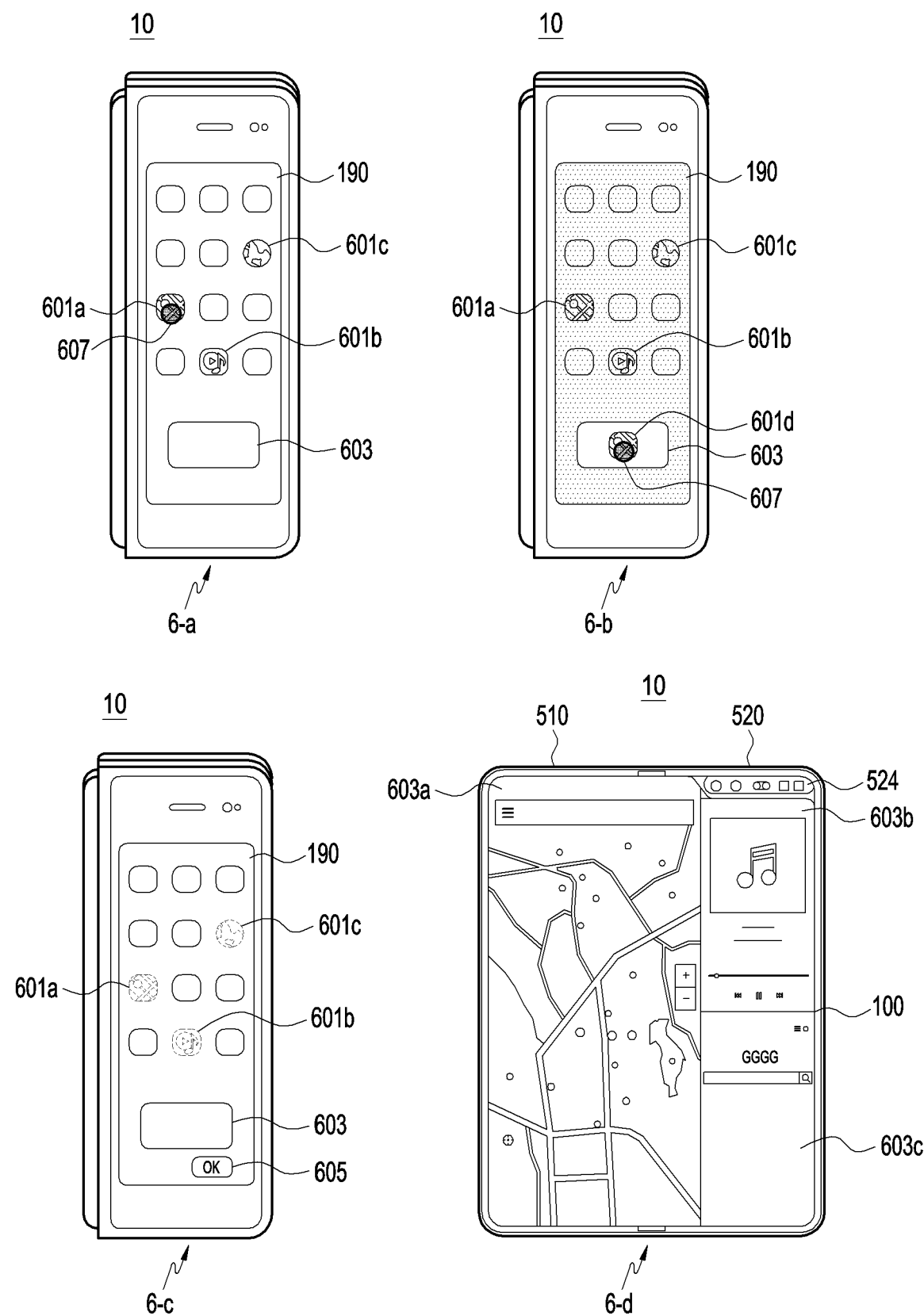
FIG. 6 is a view illustrating an electronic device simultaneously displaying a plurality of applications according to an embodiment of the disclosure.

FIG. 6 is a view illustrating an electronic device simultaneously displaying a plurality of applications according to an embodiment of the disclosure.

Referring to FIG. 5, in operation 310, the electronic device 10 may obtain a first input to select a plurality of application execution objects in a first state (e.g., a folded state) in which at least part of the display remains folded. The first input to select a plurality of application execution objects may be distinguished from an input to execute one application execution object. According to an embodiment of the disclosure, each of the plurality of application execution objects may include an object for executing an application. For example, the object may include an image, icon, text, or link to execute the application.

Referring to reference symbol 6-a of FIG. 6, the electronic device 10 may display a plurality of application execution objects using the sub display 190 in the first state. For example, in response to an external input (e.g., a user input) to select an application execution object, the electronic device 10 may execute the application corresponding to the application execution object. Execution of application may mean, e.g., activating an application to execute a set function or displaying content related to an application on the display.

According to an embodiment of the disclosure, the electronic device 10 may obtain a first input to select a plurality of application execution objects among a plurality of execution objects (e.g., all the execution objects) displayed on the sub display 190. The first input may be a long touch input 607 for touching, for a predetermined time or more, one application execution object 601a among the plurality of execution objects displayed on the sub display 190 which is touch input-capable.

In operation 320 of FIG. 5, the electronic device 10 may obtain a second input to request to display a plurality of applications corresponding to the plurality of selected application execution objects.

The second input may mean, e.g., moving the selected application execution objects to a predesignated place.

Referring to reference symbol 6-a of FIG. 6, in response to obtaining the first input, the electronic device 10 may display an execution object collecting area 603 for collecting the selected application execution objects in one area of the sub display 190.

Referring to reference symbol 6-b of FIG. 6, in response to the user's touch input 607, the electronic device 10 may move the displayed object 601d to the execution object collecting area 603 to indicate that the selected application execution object 601a is moving.

According to an embodiment of the disclosure, upon identifying a release of the touch input 607 on the object 601d in the execution object collecting area 603, the electronic device 10 may terminate the display of the object 601d in the execution object collecting area 603.

According to various embodiments of the disclosure, the electronic device 10 may terminate the display of the object 601d in the execution object collecting area 603 while simultaneously or sequentially providing the user with a notification indicating that the application execution object 601a has been selected. The notification may be provided as, e.g., a sound, vibration, text, or icon.

According to various embodiments of the disclosure, the electronic device 10 may add a shading effect to the display area of the sub display 190 except for the execution object collecting area 603 while moving the application execution object 601d, which is displayed to indicate that the selected application execution object 601a is moving, to the execution object collecting area 603.

According to an embodiment of the disclosure, the user may select another application execution object and repeat the processing of moving to the execution object collecting area 603. In this case, the electronic device 10 may obtain the number of the selected application execution objects. The electronic device 10 may split the display area of the display 100, corresponding to the number of the selected application execution objects.

According to an embodiment of the disclosure, the electronic device 10 may display the application execution object selected by the user, distinctly from the other application execution objects.

Referring to reference symbol 6-c of FIG. 6, the electronic device 10 may blur the application execution objects 601a, 601b, and 601c selected by the user, as compared with the other application execution objects. However, a method of differentiating the selected application execution objects is not limited thereto. For example, the electronic device 10 may display the application execution objects 60a, 601b, and 601c together with separate icons therefor or in a deeper color than that of the other application execution objects. Or, the electronic device may decolor and display in black and white the application execution objects 601a, 601b, and 601c selected by the user. Other various embodiments are possible as well.

According to an embodiment of the disclosure, upon obtaining the user's input to select "Ok" 605, the electronic device 10 may identify that all the selection of the application execution object is terminated. According to various embodiments of the disclosure, the electronic device 10 may refrain from displaying an object to input a termination of selection of the application execution object, like "Ok" 605.

In operation 330 of FIG. 5, the electronic device 10 may detect a switch from a first state in which at least part of the display is folded to a second state (e.g., an unfolded state) in which the display is unfolded. For example, the electronic device 10 may identify a change in the position of the first housing structure 510 and the second housing structure 520 using a hall sensor or acceleration sensor included in the electronic device 10 or a sensor included in the hinge structure 535.

In operation 340 of FIG. 5, according to a result of the detection, the electronic device 10 may split the display area of the display to correspond to the number of the plurality of selected application execution objects and execute and display the plurality of applications in at least an area (e.g., a segment of the display area) of the display area of the display.

Upon identifying a switch of the electronic device 10 from the first state to the second state after obtaining a plurality of application execution objects to be executed and displayed together on the display 100 using the execution object collecting area 603, the electronic device 10 may execute and display a plurality of applications corresponding to the plurality of selected application execution objects on the display 100.

Referring to reference symbol 6-d of FIG. 6, the electronic device 10 may split the display area of the display 100 into three areas based on the number (e.g., three) of the selected application execution objects and individually display the applications (or their application execution screens) on the areas. For example, the electronic device 10 may display a first application (e.g., a map application) in a first area 603a, a second application (e.g., a music player application) in a second area 603b, and a third application (e.g., a web browser application) in a third area 603c.

According to an embodiment of the disclosure, the electronic device 10 may pre-store various forms of splitting the display area of the display 100. For example, the electronic device 10 may store various templates to split the display area of the display 100 in two, three, or four areas and provide them according to the user's selection.

According to various embodiments of the disclosure, the electronic device 10 may provide the user with a method of splitting the display area. The method of splitting the display area, which is provided to the user, is described below with reference to FIGS. 7 to 9.

According to an embodiment of the disclosure, the electronic device 10 may determine an area where an application is displayed, based on the property of a first input to select a plurality of application execution objects. The property of the first input may be at least one of, e.g., the order in which the first input is entered, the duration of the first input, or the strength (or intensity) of the first input.

For example, the electronic device 10 may display an application corresponding to the first application execution object selected in the first area 603a. The electronic device 10 may display an application corresponding to the second application execution object selected in the second area 603b and an application corresponding to the third application execution object selected in the third area 603c. However, embodiments of the disclosure are not limited thereto.

For example, the electronic device 10 may identify the duration of a touch on the application execution object. The electronic device 10 may display applications in the first area 603a, the second area 603b, and the third area 603c in the order of longer duration identified. Or, the electronic device 10 may identify the pressure of a touch on the application execution object. The electronic device 10 may display applications in the first area 603a, the second area 603b, and the third area 603c in the order of stronger pressures identified.

The electronic device 10 may determine the area to display the application in the opposite order thereof. For example, the electronic device 10 may display an application corresponding to the third application execution object selected in the first area 603a.

According to various embodiments of the disclosure, the electronic device 10 may determine the area to display the application according to an attribute of the selected application. For example, when an application related to movie, text, and photo is selected, the electronic device 10 may display the movie-related application in the first area 603a which is the broadest.

According to various embodiments of the disclosure, the electronic device 10 may use the user's application display pattern. For example, the electronic device 10 may identify the application which has been used primarily in the first area 603a or the application which was previously moved to the first area 603a by the user's input. In this case, the electronic device 10 may determine the application to be displayed in the first area 603a regardless of the order of selecting the plurality of application execution objects.

As such, according to an embodiment of the disclosure, the electronic device 10 may split the display area of the display, which is displayed in the second state, based on the user's input to select a plurality of application execution objects in the first state, and display a plurality of applications, together, corresponding to the plurality of selected application execution objects, allowing the user to easily start the multitasking function.

According to various embodiments of the disclosure, upon obtaining the above-described first input and second input, the electronic device 10 may previously store information for the operations of reference symbol 6-d and, when the electronic device 10 turns into the second state, execute and display a plurality of applications on the display 100 as shown in reference symbol 6-d of FIG. 6.

For example, upon obtaining the first input and the second input, the display manager 261 may store information for applications to be displayed on the display 100 in the memory. The display manager 261 may store, in the memory, information for a plurality of applications corresponding to a plurality of applications selected by the user.

The display manager 261 may determine the individual display areas where the plurality of applications are displayed on the display 100 based on, e.g., the order in which the plurality of application execution objects are selected and may store them in the memory (or the frame buffer 271).

According to various embodiments of the disclosure, the display manager 261 may determine the individual display areas where the plurality of selected applications are displayed, based on at least one of the order of the user's input (e.g., touch inputs) to select a plurality of application execution objects, the strength of the input, the direction of the input (e.g., the direction of a touch-and-drag), or the duration of the input and may store them in the memory (or the frame buffer 271).

Further, according to various embodiments the display manager 261 may determine the individual display areas where the plurality of applications are displayed on the display 100, based on the attribute of the selected application. The attribute of application may be at least one of, e.g., the number of selected applications, the type of application, or the display history of application.

For example, the display manager 261 may determine the display area of display corresponding to the number of the plurality of selected applications. Or, the display manager 261 may determine the display area of display based on whether the selected application is one for providing visual information, such as a map, or one for providing auditory information, like a music player application. Or, the display manager 261 may determine the display area of display according to the order of the latest-to-oldest execution.

According to an embodiment of the disclosure, the display manager 261 may obtain data for outputting on the display 211 according to the display area determined before a plurality of applications are selected and the electronic device 10 switches from the first state (e.g., the folded state) to the second state (e.g., the unfolded state). According to an embodiment of the disclosure, the display manager 261 may receive data (or image information) to be displayed when the electronic device 10 switches from the first state (e.g., the folded state) to the second state (e.g., the unfolded state), from the processor 230 or an auxiliary processor (not shown) (e.g., a graphic processing device) operated independently from the function of the processor 230 and store the data in the DDI 221.

As such, the electronic device 10 may reduce the difference in time between when the display 211 is activated and when data related to a plurality of selected applications is displayed on the display 211 and loads of the processor 230 due to simultaneous execution of a plurality of applications and activation of the display 211 by preparing for the data to be displayed on the display 211 in the context of activating the sub display 212 using the sub DDI 222, displaying a plurality of application execution objects, and receiving a user input to select an application execution object.

According to various embodiments of the disclosure, the display manager 261 may determine an elapse of a predetermined time and delete the data (or image information) generated before the electronic device 10 switches from the first state (e.g., the folded state) to the second state (e.g., the unfolded state) from the memory (or the frame buffer 271). For example, the predetermined time may be a time elapse from when a plurality of applications are selected to when the electronic device switches.

Upon obtaining information for the switch of the electronic device 10 from the first state to the second state from the input framework 265, the folding/unfolding event handler 263 may request the power manager 267 and the display manager 261 to activate the display 100. The power manager 267 and the display manager 261 may control the display 100 using information pre-stored in the memory (or the frame buffer 271), executing and individually displaying, in preset display areas, the plurality of applications.

According to an embodiment of the disclosure, the electronic device 10 may include further a sub display 212 to display a plurality of application execution objects for executing a plurality of applications. The method of controlling the electronic device 10 may include determining the area to display the plurality of applications of the display area of the display 211, based on the order in which the application execution objects displayed on the sub display 212 are selected.

According to an embodiment of the disclosure, the electronic device 10 may include further a sub display 212 to display a plurality of application execution objects for executing a plurality of applications. The method of controlling the electronic device 10 may include determining the area to display the plurality of applications of the display area of the display 211, based on the time when the application execution object displayed on the sub display 212 is touched.

According to an embodiment of the disclosure, the electronic device 10 may further include a sub display 212 to display a plurality of application execution objects for executing a plurality of applications. The method of controlling the electronic device 10 may include determining a form to split the display area of the display 211, based on a touch-and-drag input on the sub display 212.

Figure 7:
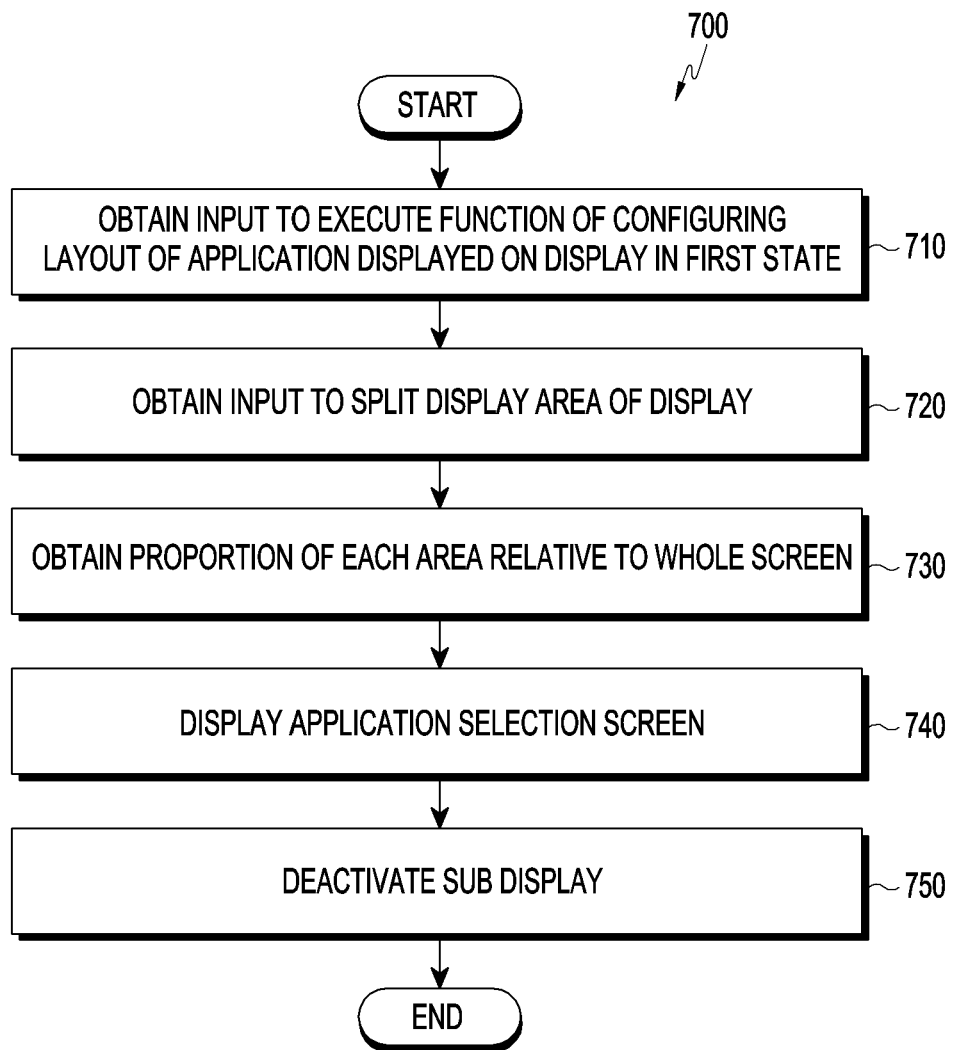
FIG. 7 is a flowchart illustrating a context in which an electronic device generates a display area to display a plurality of applications according to an embodiment of the disclosure.

FIG. 7 is a flowchart 700 illustrating a context in which an electronic device generates a display area to display a plurality of applications according to an embodiment of the disclosure.

Figure 8A:
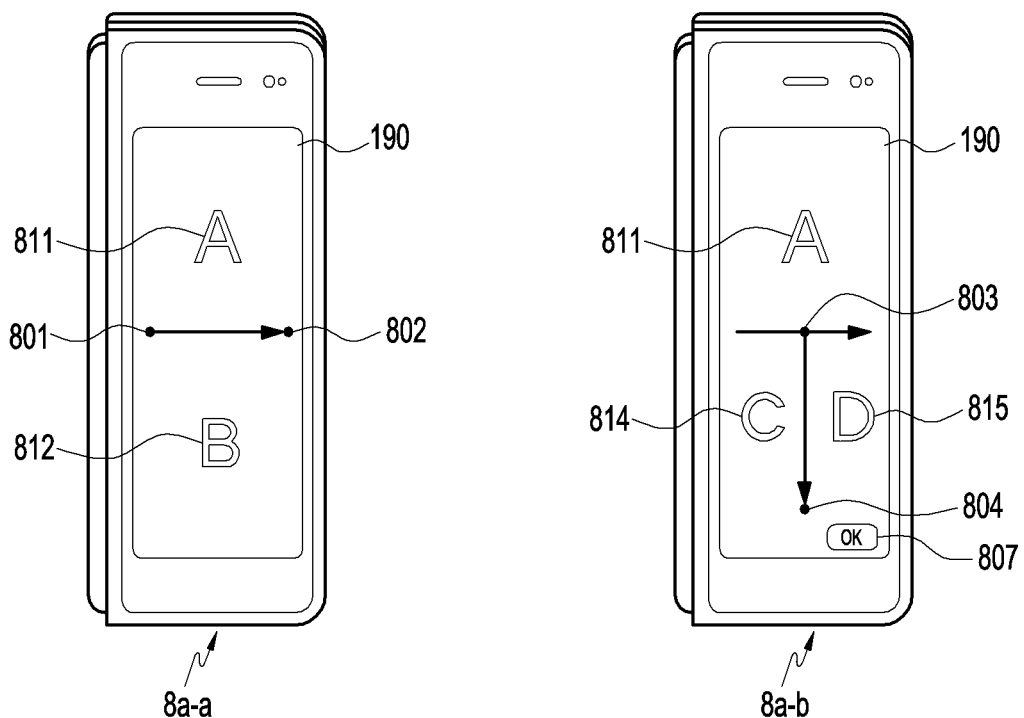
FIG. 8A is a view illustrating a context in which an electronic device generates a display area to display a plurality of applications according to an embodiment of the disclosure.
Figure 8A:
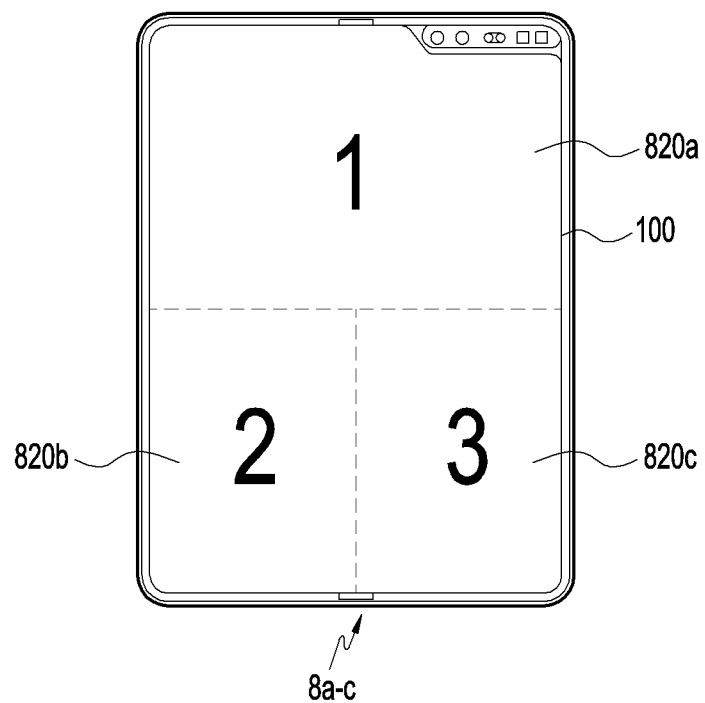

FIG. 8A is a view illustrating a context in which an electronic device generates a display area to display a plurality of applications according to an embodiment of the disclosure.

Figure 8B:
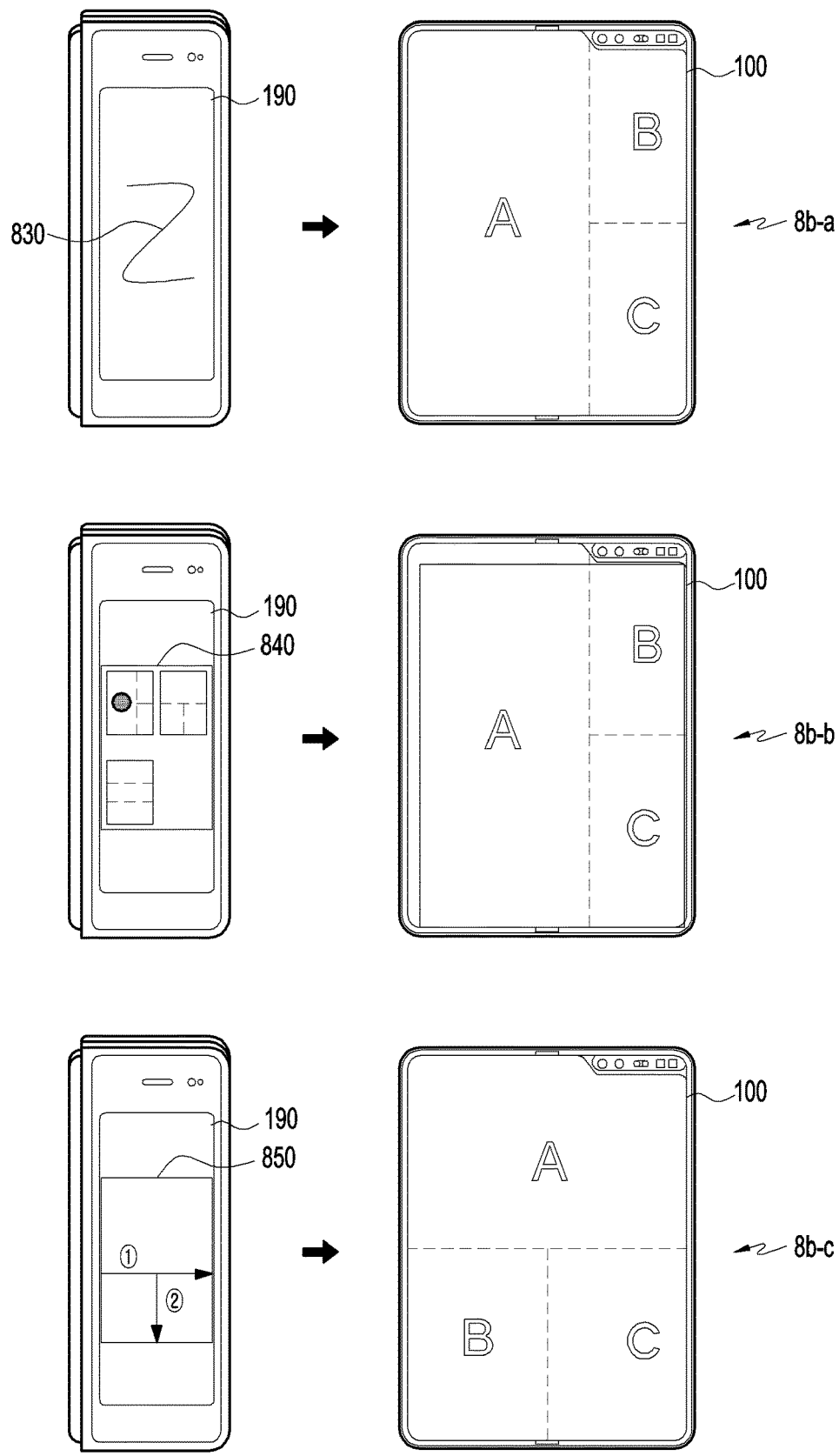
FIG. 8B is a view illustrating a context in which an electronic device generates a display area to display a plurality of applications according to an embodiment of the disclosure.

FIG. 8B is a view illustrating a context in which an electronic device generates a display area to display a plurality of applications according to an embodiment of the disclosure.

Referring to FIG. 7, in operation 710, the electronic device 10, in the first state, may obtain an external input to execute the function of configuring a layout of applications displayed on the display. For example, the user may execute the function of configuring the operation of the electronic device 10 and the function of inputting a form to split the display area of the display.

In operation 720, the electronic device 10 may obtain a user input to split the display area of the display.

Referring to reference symbol 8a-a of FIG. 8A, the electronic device 10 may obtain a touch-and-drag input that starts from a first point 801 and proceeds to a second point 802 of the sub display 190. Referring to reference symbol 8a-b of FIG. 8A, the electronic device 10 may obtain a touch-and-drag input that starts from a third point 803 and proceeds to a fourth point 804.

According to various embodiments of the disclosure, upon obtaining a user input to select "Ok" 807, the electronic device 10 may identify that all the user input to split the display area is terminated.

In operation 730 of FIG. 7, the electronic device 10 may obtain a proportion of each area relative to the entire display area of the sub display.

Referring to FIG. 8A, if the user input to split the display area is terminated, the electronic device 10 may obtain the proportion in which each of the areas, split into by the user input, occupies the display area of the sub display 190. The electronic device 10 may split the display area of the display 100 using the proportion in which each of the areas, split into, occupies the display area of the sub display 190.

For example, referring to reference symbol 8a-a of FIG. 8A, the electronic device 10 may identify that the display area of the sub display 190 is split in half into area A 811 and area B 812 along the vertical direction, based on the touchand-drag input which starts from the first point 801 and proceeds to the second point 802.

Referring to reference symbol 8*a-b* of FIG. 8A, the electronic device 10 may identify that area B 812, which has been already split into, is split in half into area C 814 and area D 815 along the horizontal direction, based on the touch-and-drag input which starts from the third point 803 and proceeds to the fourth point 804.

In operation 740 of FIG. 7, the electronic device 10 may display an application selection screen. For example, the electronic device 10 may display an application selection screen including a plurality of application execution objects through the sub display 190. Further, the electronic device 10 may identify selected applications, based on a first input to select execution objects. Upon identifying that the electronic device 10 switches into the second state, the electronic device 10 may display applications corresponding to the selected applications, according to an input layout.

For example, referring to reference symbol 8*a-c* of FIG. 8A, the electronic device 10 may match area A 811, area C 814, and area D 815 to the first area 820*a*, the second area 820*b*, and the third area 820*c*, split the display area of the display 100, and execute and individually display, on the areas, a plurality of applications.

According to an embodiment of the disclosure, the electronic device 10 may display the latest three applications executed by the electronic device in the first area 820*a*, the second area 820*b*, and the third area 820*c*. Or, the electronic device 10 may obtain per-application execution frequencies and display, in order, three applications most frequently executed in the first area 820*a*, the second area 820*b*, and the third area 820*c*.

According to various embodiments of the disclosure, the electronic device 10 may individually display three relevant applications in the plurality of areas split into, using location information about the electronic device 10. For example, the electronic device 10 may display a map application indicating the current location of the electronic device 10 in the first area 820*a*, a web search result for the place frequently searched for in the current location in the second area 820*b*, and one of search results in the third area 820*c*.

According to an embodiment of the disclosure, the electronic device 10 may display three applications in the first area 820*a*, the second area 820*b*, and the third area 820*c* based on the user's pattern. For example, the electronic device 10 may obtain information for the applications that the user has executed, based on state information (e.g., the current time or the state of connection with the peripheral device) for the electronic device 10 and display three relevant applications in the first area 820*a*, the second area 820*b*, and the third area 820*c*.

In operation 750 of FIG. 7, the electronic device 10 may deactivate the sub display 190.

FIG. 8B is a view illustrating a context in which an electronic device provides a display area to display a plurality of applications according to an embodiment of the disclosure.

According to an embodiment of the disclosure, the electronic device 10 may store a form of splitting the display area to display a plurality of applications in response to a predesignated gesture and, upon identifying an input of the predesignated gesture, provide the form of the display area.

Referring to reference symbol 8*b-a* of FIG. 8B, the electronic device 10 may identify an input of a predesignated form of gesture 830 via the sub display 190. The electronic device 10 may obtain a display area split form corresponding to the identified gesture 830 and, when the electronic device 10 turns into the second state, split the display area of the display 100 and display a plurality of applications.

According to an embodiment of the disclosure, the electronic device 10 may provide a frame to indicate the pre-stored split form.

Referring to reference symbol 8*b-b* of FIG. 8B, the electronic device 10 may display frames 840 to indicate the pre-stored split form via the sub display 190. The electronic device 10 may identify a frame selected by the user's input from among the displayed frames 840 and, when the electronic device 10 turns into the second state, split the display area of the display 100 and display a plurality of applications.

According to an embodiment of the disclosure, the electronic device 10 may provide a form of the display 100 to the sub display 190 and obtain the user's split input.

Referring to reference symbol 8*b-c* of FIG. 8B, the electronic device 10 may display a shrunken shape 850 of the display 100 including a similar form to the horizontal-vertical ratio of the display 100 on the sub display 190. In response to the user's touch inputs (①, ②) to the displayed shrunken shape 850, the electronic device 10 may obtain an input to split the display area of the display 100 and, when the electronic device 10 turns into the second state, split the display area of the display 100 and display a plurality of applications.

According to various embodiments of the disclosure, the electronic device 10 may determine a split form to display applications on the display 100 based on the user's operation of inputting a first input.

For example, the electronic device 10 may identify the duration of a touch to select an application execution object and the strength of a touch pressure to select an application execution object. The electronic device 10 may summate the duration of the touch on each application execution object and divide the result by the total duration of the touch on each application. The electronic device 10 may determine the split form to display applications on the display 100 according to the ratio resultant from the division.

According to an embodiment of the disclosure, the electronic device 10 may execute the operations described above in connection with FIG. 7 before performing the operations described above in connection with FIG. 5. For example, the electronic device 10 may determine the number of segments of the display area of the display based on the operations described above in connection with FIG. 7 and, in the operations of FIG. 5, limit the number of application execution objects that may be selected, based on the determined number of segments of the display area of the display. According to another embodiment of the disclosure, the electronic device 10 may execute the operations described above in connection with FIG. 7 after performing operation 320 of FIG. 5. However, embodiments of the disclosure are not limited thereto. The electronic device 10 may perform the operations of FIG. 5 and the operations of FIG. 7 in association therewith, in various combinations.

Figure 9:
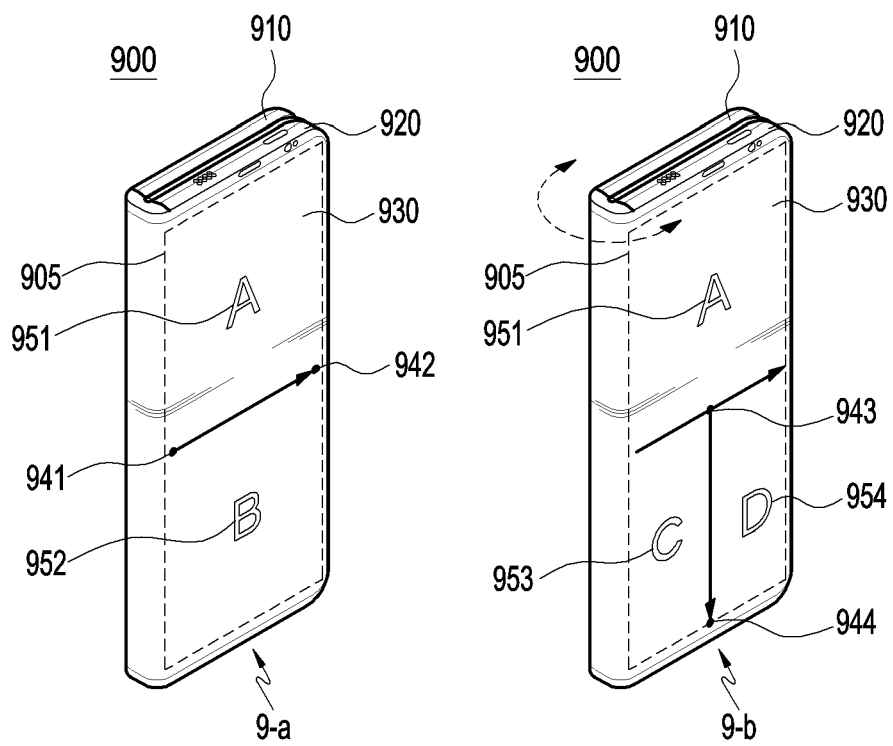
FIG. 9 is a view illustrating a context in which an electronic device generates a display area to display a plurality of applications according to another embodiment of the disclosure.

FIG. 9 is a view illustrating a context in which an electronic device generates a display area to display a plurality of applications according to another embodiment of the disclosure.

Referring to FIG. 9, an electronic device 900 may include a first housing structure 910, a second housing structure 920, and a display 930. However, embodiments of the disclosure are not limited thereto. The electronic device 900 may further include a plurality of components or exclude some components. The display 930 may be a flexible display which may be partially folded or unfolded.

According to an embodiment of the disclosure, as shown with reference symbol 9-a or 9-b of FIG. 9, a first state of the electronic device 900 may be a state in which a middle of a display 930 is folded so that one of the first housing structure 910 is disposed to face one surface of the second housing structure 920. Further, as shown with reference symbol 9-c of FIG. 9, a second state of the electronic device 900 may be a state in which the first housing structure 910 and the second housing structure 920 are disposed flush with each other.

The first state and second state of the electronic device 900 differ from the first state and second state of the electronic device 10 of FIG. 1 in light of the direction in which the display 930 is folded. For example, in the first state of the electronic device 900, the first housing structure 910 and the second housing structure 920 may be disposed to face each other so that the display 930 is seen to the outside.

According to an embodiment of the disclosure, in the first state, the electronic device 900 may activate only one area of the display 930. For example, the electronic device 900 may activate one area of the display 930, which faces the ground, using an acceleration sensor or one area of the display 930, which faces the user, using a camera sensor.

According to an embodiment of the disclosure, at least an internal portion of the first housing structure 910 may be empty to have electronic components (e.g., a printed circuit board, at least one processor mounted on the printed circuit board, at least one memory, a battery, or other components) necessary for driving the display 930, placed therein. According to various embodiments of the disclosure, the periphery of the first housing structure 910 may be prepared to wrap around a side edge of the display 930.

At least an internal portion of the second housing structure 920 may be empty to have electronic components necessary for driving the display 930 placed therein, as is the first housing structure 910 According to various embodiments of the disclosure, the periphery of the second housing structure 920 may be prepared to wrap around the opposite side edge of the display 930.

According to an embodiment of the disclosure, the display 930 may be prepared so that at least a portion thereof is bendable (or foldable). The display 930 may include a first area disposed on the first housing structure 910, a second area disposed on the second housing structure 920, and a folding area within a predetermined range from where the first housing structure 910 and the second housing structure 920 abut. At least a portion of the folding area may be flexible.

Referring to reference symbol 9-a of FIG. 9, the electronic device 900, in the first state, may obtain a touch-and-drag input that starts from a first point 941 of the display 930 and proceeds to a second point 942. Referring to reference symbol 9-b of FIG. 9, the electronic device 900 may obtain a touch-and-drag input that starts from a third point 943 of the display 930 and proceeds to a fourth point 944.

Referring to FIG. 9, if the user input to split the display area is terminated, the electronic device 900 may obtain the proportion in which each of the areas, split into by the user input, occupies the activated area of the display 930. The electronic device 900 may split the display area of the display 930, which is activated in the second state, using the proportion in which each of the areas, split into, occupies the activated area of the display 930. The activated area 905 may be an area that displays content to the user using at least one of an acceleration sensor or a camera sensor in a case where the electronic device 900 is in the first state, as shown with reference symbol 9-a of FIG. 9, for example. According to an embodiment of the disclosure, the activated area 905 is resizable.

For example, referring to reference symbol 9-a of FIG. 9, the electronic device 900 may identify that the display area of the display 930 is split in half into area A 951 and area B 952 along the vertical direction, based on the touch-and-drag input which starts from the first point 941 and proceeds to the second point 942.

Referring to reference symbol 9-b of FIG. 9, the electronic device 900 may identify that area B 952, which has been already divided, is split in half into area C 953 and area D 954 along the horizontal direction, based on the touch-and-drag input which starts from the third point 943 and proceeds to the fourth point 944.

Referring to reference symbol 9-c of FIG. 9, when turning into the second state, the electronic device 900 may display a plurality of applications as described above in connection with FIG. 8A.

For example, referring to reference symbol 9-c of FIG. 9, the electronic device 900 may match area A 951, area C 953, and area D 954 to a first area 930a, the second area 930b, and the third area 930c, split the whole display area of the display 930, and execute and individually display, on the areas, a plurality of applications.

Figure 10:
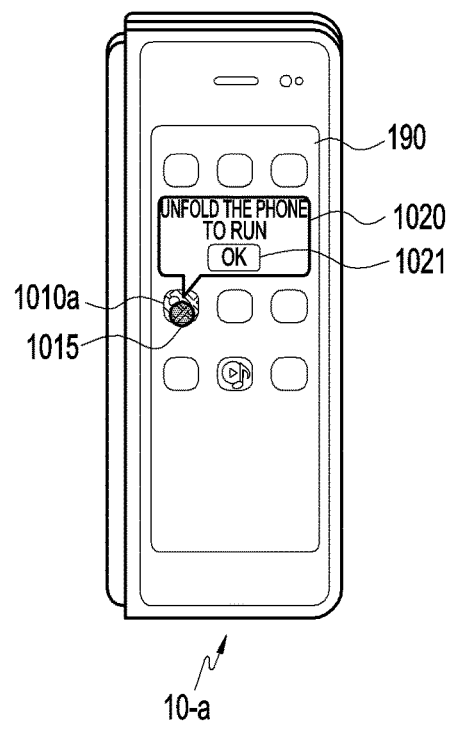
FIG. 10 is a view illustrating a method in which an electronic device simultaneously displays a plurality of applications according to an embodiment of the disclosure.
Figure 10:
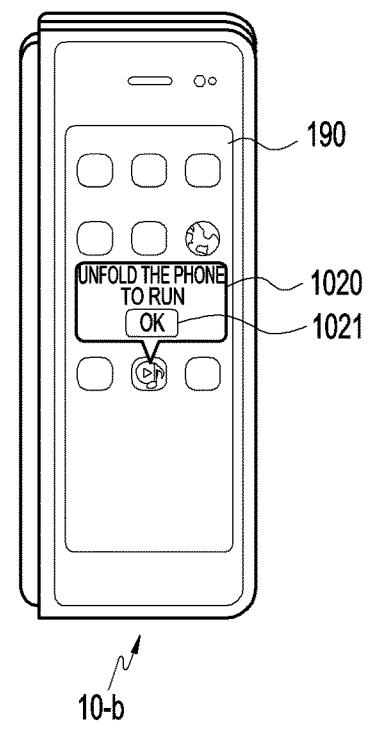
Figure 10:
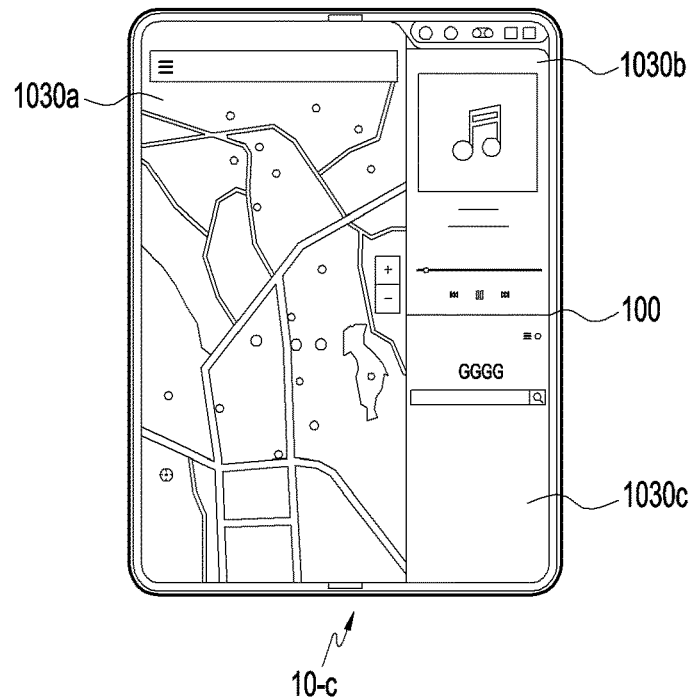

FIG. 10 is a view illustrating a method in which an electronic device simultaneously displays a plurality of applications according to an embodiment of the disclosure.

Referring to reference symbol 10-a of FIG. 10, the electronic device 10 may display a plurality of application execution objects using the sub display 190 in the first state. For example, in response to an external input (e.g., a user input) to select an application execution object, the electronic device 10 may execute the application corresponding to the application execution object. Execution of application may mean, e.g., activating an application to execute a set function or displaying content related to an application on the display.

Referring to reference symbol 10-a of FIG. 10, the electronic device 10 may obtain a first input to select at least one or more application execution objects from among a plurality of execution objects displayed on the sub display 190. The first input may be a long touch input 1015 for touching, for a predetermined time or more, one application execution object 1010a among the plurality of execution objects displayed on the sub display 190 which is touch input-capable.

Referring to reference symbol 10-a of FIG. 10, the electronic device 10 may obtain a second input to request to display at least one or more applications corresponding to at least one selected application execution object.

The second input may mean an input to execute the selected application execution object when the electronic device 10 turns into the second state, for example.

For example, in response to obtaining the first input, the electronic device 10 may display a notification (e.g., "Unfold the phone to run") 1020 to request to confirm a condition for executing the application corresponding to the application execution object selected in one area of the sub display 190.

Upon obtaining a user input to select "Ok" 1021 included in the notification 1020, the electronic device 10 may terminate the display of the notification 1020 and determine to execute the application corresponding to the selected application execution object 1010*a* when the electronic device 10 turns into the second state.

Referring to reference symbol 10-*b* of FIG. 10, the user may repeat the process of selecting an application execution object. In this case, the electronic device 10 may obtain the number of the selected application execution objects.

According to an embodiment of the disclosure, according to a switch of the electronic device 10 from the first state to the second state, the electronic device 10 may split the display area of the display to correspond to the number of a plurality of selected application execution objects and execute and display a plurality of applications on at least two areas of the display area of the display.

Referring to reference symbol 10-*c* of FIG. 10, the electronic device 10 may split the display area of the display 100 into three areas based on the number of the selected application execution objects and individually display the applications. For example, the electronic device 10 may display a first application (e.g., a map application) in a first area 1030*a*, a second application (e.g., a music player application) in a second area 1030*b*, and a third application (e.g., a web browser application) in a third area 1030*c*.

Figure 11:
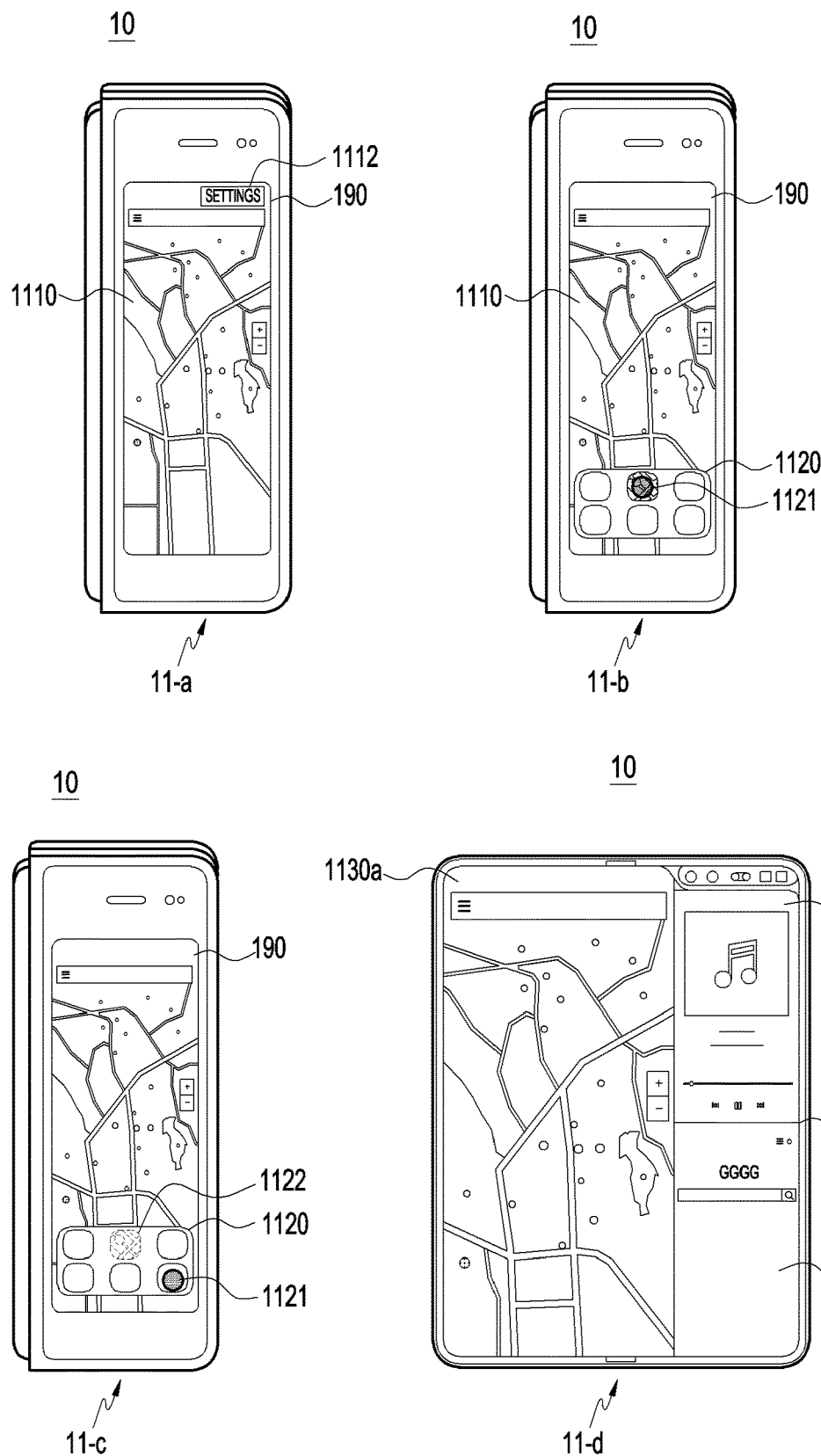
FIG. 11 is a view illustrating a method in which an electronic device simultaneously displays a plurality of applications according to an embodiment of the disclosure.

FIG. 11 is a view illustrating a method in which an electronic device simultaneously displays a plurality of applications according to an embodiment of the disclosure.

Referring to reference symbol 11-*a* of FIG. 11, the electronic device 10 may display one application (e.g., the map application 1110) on the sub display 190.

According to an embodiment of the disclosure, the electronic device 10 may obtain a second input to request to display at least one or more applications corresponding to at least one selected application execution object on the display 100.

For example, the electronic device 10 may provide a menu for configuring the functions of the electronic device 10, e.g., "settings" 1112, in the context of displaying the map application 1110. The user may select "settings" 1112 to enter an input as to whether to execute the function of selecting an application to be executed on the display 100 when the electronic device 10 turns into the second state, along with the application (e.g., the map application 1110) being executed on the sub display 190.

According to the input of the function to select the application to be executed together on the display 100, the electronic device 10 may display the application execution objects 1120 in an area of the sub display 190.

Referring to reference symbol 11-*b* of FIG. 11, the electronic device 10 may obtain a first input to select at least one or more application execution objects 1122 from among a plurality of application execution objects 1120 displayed on the sub display 190. For example, the first input may be an input 1121 to select at least one or more application execution objects 1122 from among the plurality of application execution objects 1120 displayed in one area of the sub display 190.

Referring to reference symbol 11-*c* of FIG. 11, the user may repeat the process of selecting an application execution object.

According to an embodiment of the disclosure, the electronic device 10 may display the application execution object selected by the user, distinctly from the other application execution objects. For example, the electronic device 10 may blur the application execution objects selected by the user, as compared with the other application execution objects. The electronic device 10 may obtain the number of the selected application execution objects.

According to an embodiment of the disclosure, according to a switch of the electronic device 10 from the first state to the second state, the electronic device 10 may split the display area of the display to correspond to the number of at least one or more selected application execution objects and execute and display at least one or more applications on at least one area of the display area of the display.

Referring to reference symbol 11-*d* of FIG. 11, the electronic device 10 may split the display area of the display 100 into a plurality of areas (e.g., three areas) based on the number of the selected application execution objects and individually display the applications. For example, the electronic device 10 may display a first application (e.g., a map application) in a first area 1130*a*, a second application (e.g., a music player application) in a second area 1130*b*, and a third application (e.g., a web browser application) in a third area 1130*c*.

According to another embodiment of the disclosure, the electronic device 10 may display "Ok" to input the termination of selection of the application execution objects, adjacent to (or inside of) the certain area where the plurality of application execution objects 1120 are displayed. Upon obtaining a user input to select "Ok," the electronic device 10 may identify that all the selection of the application execution object has been terminated. In this case, the electronic device 10 may stop displaying the application execution objects 1120 which are being displayed in the certain area.

According to an embodiment of the disclosure, the electronic device 10 may determine an area to display a plurality of applications, of the display area of the display, based on a property of an input to select an application execution object. For example, the electronic device 10 may display applications corresponding to application execution objects in a first area 1130*a*, a second area 1130*b*, and a third area 1130*c* according to the order in which application execution objects are selected.

Or, the electronic device 10 may display applications corresponding to application execution objects in a first area 1130*a*, a second area 1130*b*, and a third area 1130*c* according to the times when the application execution objects are touched.

According to an embodiment of the disclosure, even when the electronic device 10 becomes the second state a predetermined time (e.g., 10 to 20 minutes) after the selection of application execution objects is terminated, the electronic device 10 may display applications corresponding to the selected application execution objects and the application being executed on the sub display 190, together, on the display 100. According to another embodiment of the disclosure, if the electronic device 10 turns into the second state after the running application (e.g., the map application 1110) is terminated or a designated time (e.g., one hour) after the selection of the application execution objects is terminated, the electronic device 10 may refrain from displaying the plurality of applications on the display 100.

As such, according to an embodiment of the disclosure, the electronic device may receive the second input to request to split the display area of the display 100 and display the plurality of selected applications, first, and then the first input to select an application execution object to be executed together on the display 100 from among the plurality of execution objects displayed on the sub display 190.

Figure 12:
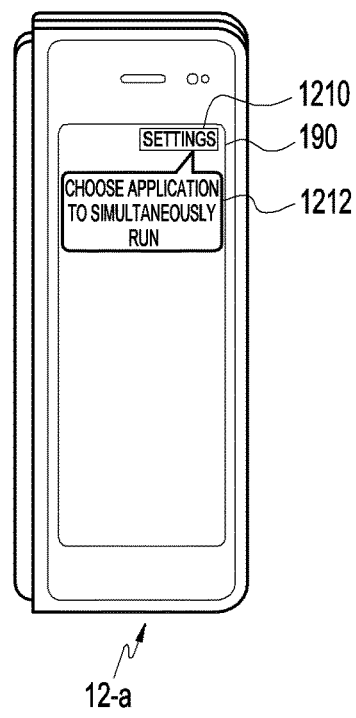
FIG. 12 is a view illustrating a method in which an electronic device simultaneously displays a plurality of applications according to an embodiment of the disclosure.
Figure 12:
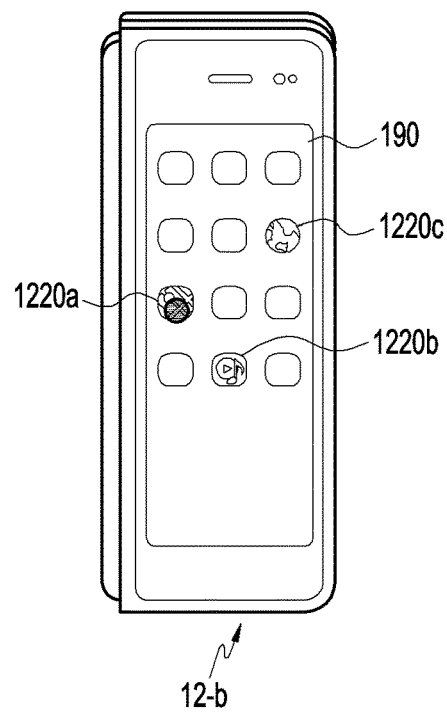
Figure 12:
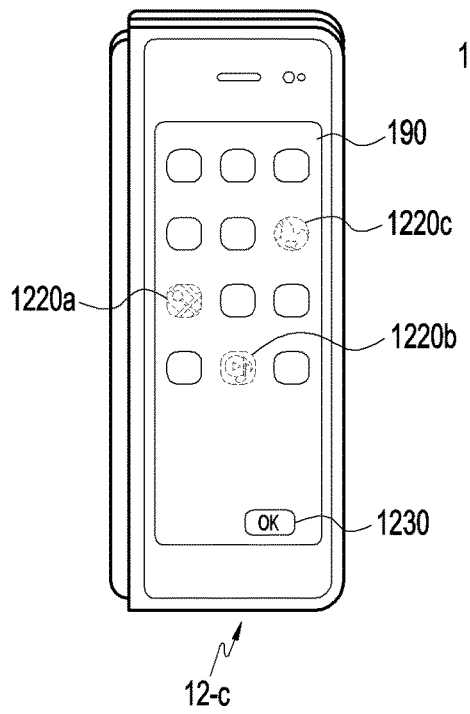
Figure 12:
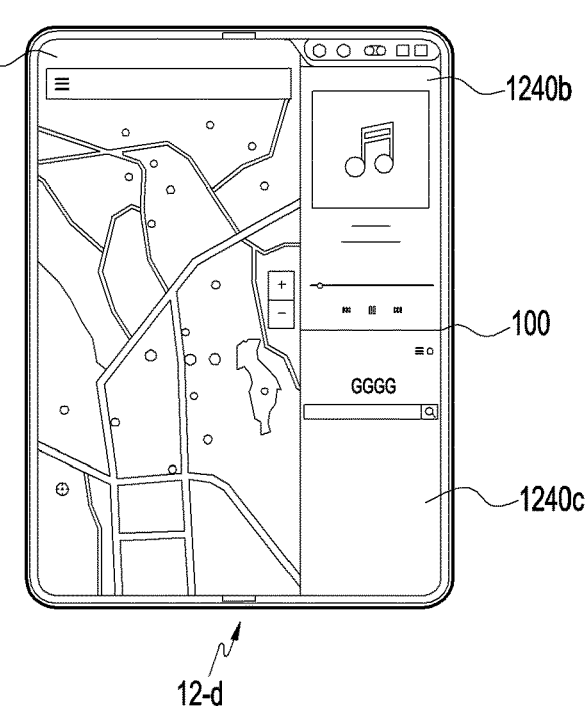

FIG. 12 is a view illustrating a method in which an electronic device simultaneously displays a plurality of applications according to an embodiment of the disclosure.

Referring to FIG. 12, according to an embodiment of the disclosure, the electronic device 10 may obtain a second input to request to display at least one or more applications corresponding to at least one selected application execution object.

Referring to reference symbol 12-*a* of FIG. 12, for example, the electronic device 10 may provide a menu to configure a function for executing a plurality of applications in the second state of the electronic device 10. The user may select "settings" 1210 and, when the electronic device 10 turns into the second state, input to execute the function 1212 of selecting a plurality of applications to be executed on the display 100.

According to an input of the function of selecting a plurality of applications to be executed together on the display 100, the electronic device 10 may display application execution objects on the sub display 190.

Referring to reference symbol 12-*b* of FIG. 12, the electronic device 10 may obtain a first input to select at least one or more application execution objects from among a plurality of application execution objects displayed on the sub display 190. The first input may be an input to select at least one or more application execution objects 1220*a* from among the application execution objects displayed on the sub display 190, for example.

Referring to reference symbol 12-*c* of FIG. 12, the user may repeat the process of selecting an application execution object.

According to an embodiment of the disclosure, the electronic device 10 may display the application execution object selected by the user, distinctly from the other application execution objects. For example, the electronic device 10 may blur the application execution objects 1220*a*, 1220*b*, and 1220*c* selected by the user, as compared with the other application execution objects.

Referring to reference symbol 12-*c* of FIG. 12, the electronic device 10 may display "Ok" 1230 to input the termination of selection of application execution objects in one area of the sub display 190. Upon obtaining a user input to select "Ok" 1230, the electronic device 10 may identify that all the selection of the application execution object has been terminated. The electronic device 10 may obtain the number of the selected application execution objects.

According to an embodiment of the disclosure, according to a switch of the electronic device 10 from the first state to the second state, the electronic device 10 may split the display area of the display to correspond to the number of at least one or more selected application execution objects and execute and display at least one or more applications on at least one area of the display area of the display.

Referring to reference symbol 12-*d* of FIG. 12, the electronic device 10 may split the display area of the display 100 into a plurality of areas (e.g., three areas) based on the number of the selected application execution objects and individually display the applications. For example, the electronic device 10 may display a first application (e.g., a map application) in a first area 1240*a*, a second application (e.g., a music player application) in a second area 1240*b*, and a third application (e.g., a web browser application) in a third area 1240*c*.

Figure 13:
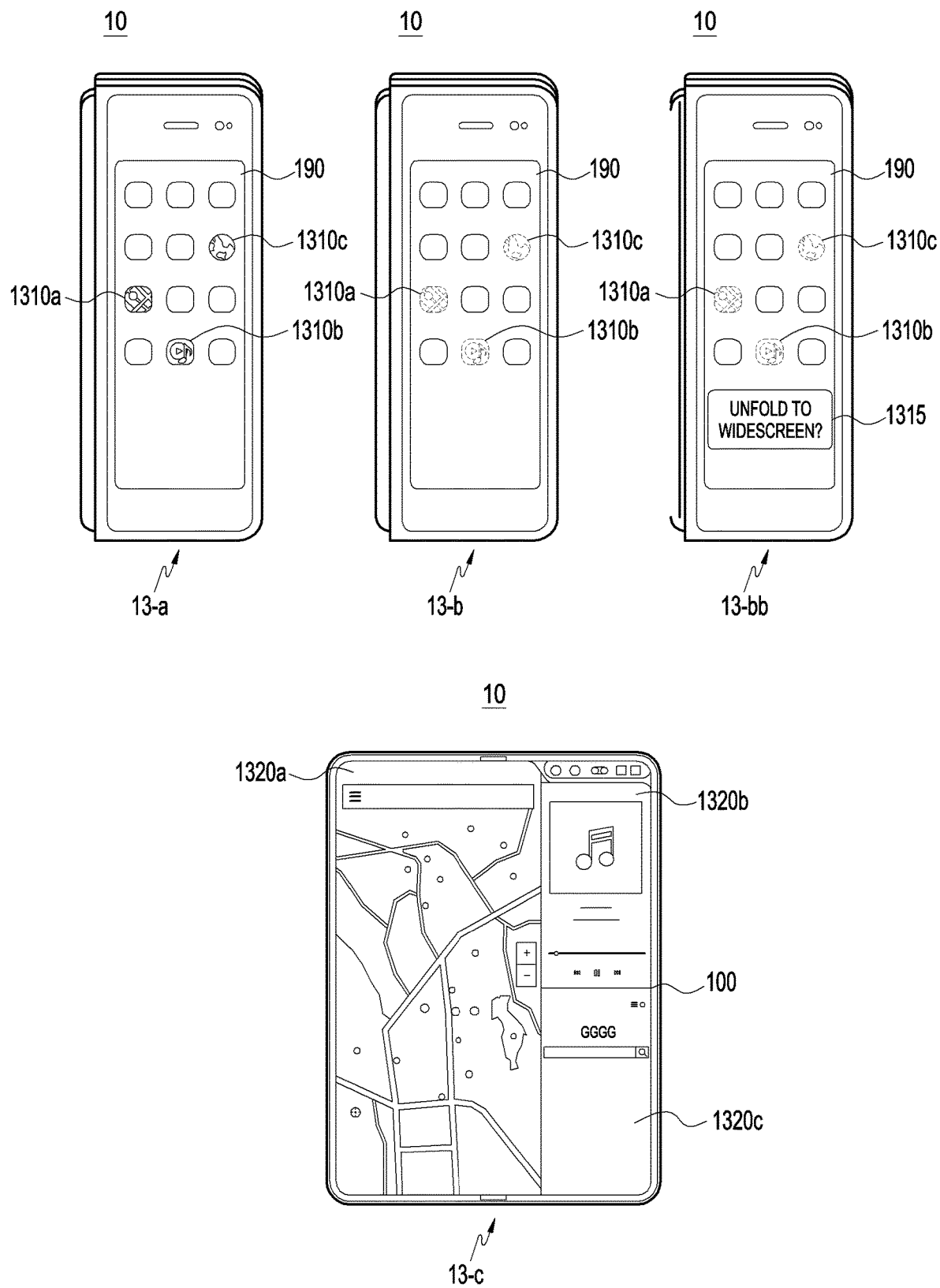
FIG. 13 is a view illustrating a method in which an electronic device simultaneously displays a plurality of applications according to an embodiment of the disclosure.

FIG. 13 is a view illustrating a method in which an electronic device simultaneously displays a plurality of applications according to an embodiment of the disclosure.

Referring to FIG. 13, according to an embodiment of the disclosure, the electronic device 10 may obtain the first input to select at least one or more application execution objects in the first state and the second input to request to display at least one or more applications corresponding to at least one or more selected application execution objects when the electronic device 10 turns into the second state, as a single input.

For example, referring to reference symbol 13-*a* of FIG. 13, the electronic device 10 may obtain an external input to select at least one or more application execution objects 1310*a*, 1310*b*, and 1310*c* from among a plurality of application execution objects displayed on the sub display 190 within a preset time (e.g., 5 to 7 seconds). In this case, the electronic device 10 may obtain the number of the selected application execution objects.

In other words, obtaining the first input and the second input may mean selecting at least one or more application execution objects within the preset time.

According to various embodiments of the disclosure, the electronic device 10 may identify a touch-and-drag input (or a swipe input) to move an application execution object to an area where another application execution object is positioned, with the application execution object selected, as simultaneously obtaining the first input and the second input.

Referring to reference symbol 13-*b* of FIG. 13, the electronic device 10 may display the application execution object selected by the user, distinctly from the other application execution objects. For example, the electronic device 10 may blur the application execution objects 1310*a*, 1310*b*, and 1310*c* selected by the user, as compared with the other application execution objects.

According to an embodiment of the disclosure, according to a switch of the electronic device 10 from the first state to the second state, the electronic device 10 may split the display area of the display to correspond to the number of at least one or more selected application execution objects and execute and display at least one or more applications on at least one area of the display area of the display. Referring to reference symbol 13-*bb* of FIG. 13, the electronic device 10 may display guide information 1315 on the sub display 190 when an application execution object is selected by the user. For example, the guide information may include information indicating that applications corresponding to the selected execution objects may be executed on a spread, wide screen.

According to various embodiments of the disclosure, when the electronic device 10 switches from the first state to the second state (e.g., turns into the unfolded state) after displaying the guide information 1315, the electronic device 10 may split the display area of the display to correspond to the number of at least one or more selected application execution objects and execute and display at least one or more applications on at least one area of the display area of the display.

According to various embodiments of the disclosure, the guide information may also include information indicating that applications corresponding to execution objects selected via the sub display 190 may be executed in the folded state. At this time, the guide information may further include an object for identifying whether the user displays an application execution screen on the sub display 190. For example, after displaying the guide information 1315, the electronic device 10 may split the display area of the display to correspond to the number of at least one or more selected application execution objects and execute and display at least one or more applications on at least one area of the display area of the display.

Referring to reference symbol 13-*c* of FIG. 13, the electronic device 10 may split the display area of the display 100 into a plurality of areas (e.g., three areas) based on the number of the selected application execution objects and individually display the applications. For example, the electronic device 10 may display a first application (e.g., a map application) in a first area 1320a, a second application (e.g., a music player application) in a second area 1320b, and a third application (e.g., a web browser application) in a third area 1320c.

Figure 14:
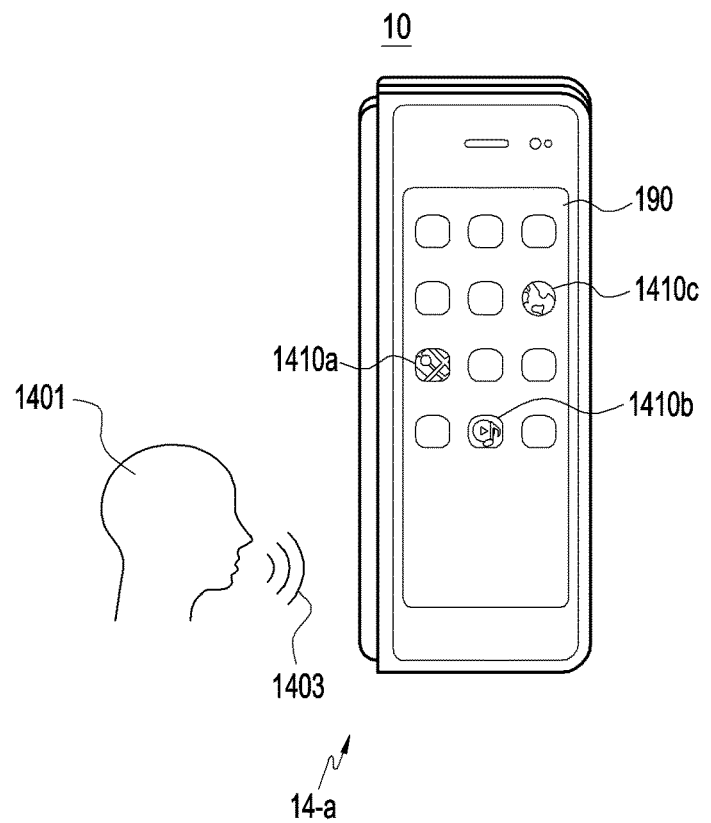
FIG. 14 is a view illustrating a method in which an electronic device simultaneously displays a plurality of applications according to an embodiment of the disclosure.
Figure 14:
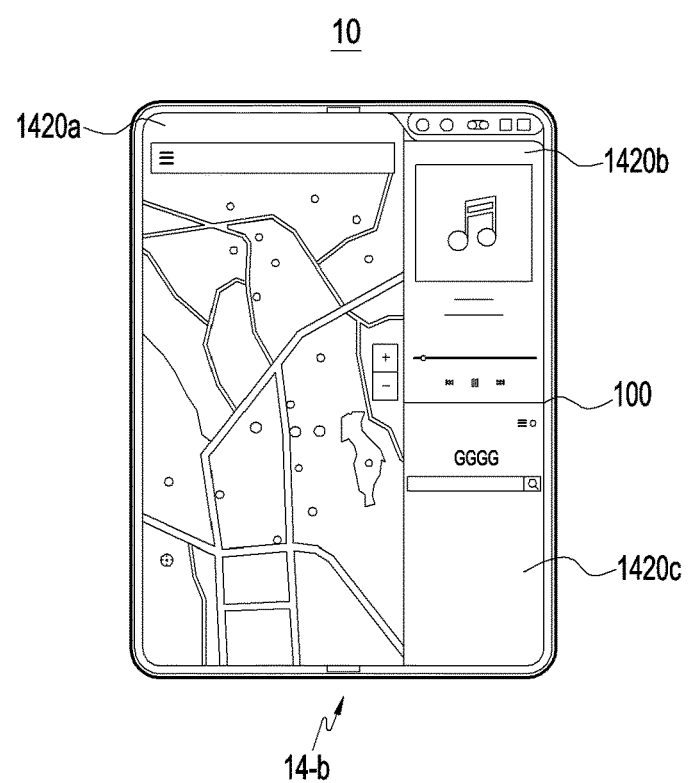

FIG. 14 is a view illustrating a method in which an electronic device simultaneously displays a plurality of applications according to an embodiment of the disclosure.

Referring to FIG. 14, according to an embodiment of the disclosure, the electronic device 10 may obtain and recognize the user's voice and identify the content included in the voice.

For example, referring to reference symbol 14-a of FIG. 14, the electronic device 10, in the first state, may obtain a voice 1403 of the user 1401 to request to display a plurality of application execution objects on the sub display 190. According to a result of recognition of the obtained voice, the electronic device 10 may display a plurality of application execution objects on the sub display 190.

The electronic device 10 may select at least one or more application execution objects and obtain a voice to request to execute them together in the second state. According to a result of recognition of the obtained voice, the electronic device 10 may select at least one or more application execution objects 1410a, 1410b, and 1410c. In this case, the electronic device 10 may obtain the number of the selected application execution objects.

According to an embodiment of the disclosure, the electronic device 10 may display the application execution object selected by the user, distinctly from the other application execution objects. For example, the electronic device 10 may blur the application execution objects 1410a, 1410b, and 1410c selected by the user, as compared with the other application execution objects.

According to an embodiment of the disclosure, the electronic device 10 may identify the names of the plurality of applications included in the user's voice command received in the first state and display execution objects corresponding to the identified applications on the sub display 190. For example, in a case where the user issues an utterance, saying "Run a map, music, and web search!" the electronic device 10 may display a plurality of execution objects (e.g., a map application execution object 1410a, a music application execution object 1410b, and a web search execution object 1410c) in at least a portion of the sub display 190.

According to an embodiment of the disclosure, according to a switch of the electronic device 10 from the first state to the second state, the electronic device 10 may split the display area of the display to correspond to the number of at least one or more selected application execution objects and execute and display at least one or more applications on at least one area of the display area of the display.

Referring to reference symbol 14-b of FIG. 14, the electronic device 10 may split the display area of the display 100 into a plurality of areas (e.g., three areas) based on the number of the selected application execution objects and individually display the applications. For example, the electronic device 10 may display a first application (e.g., a map application) in a first area 1420a, a second application (e.g., a music player application) in a second area 1420b, and a third application (e.g., a web browser application) in a third area 1420c.

Figure 15:
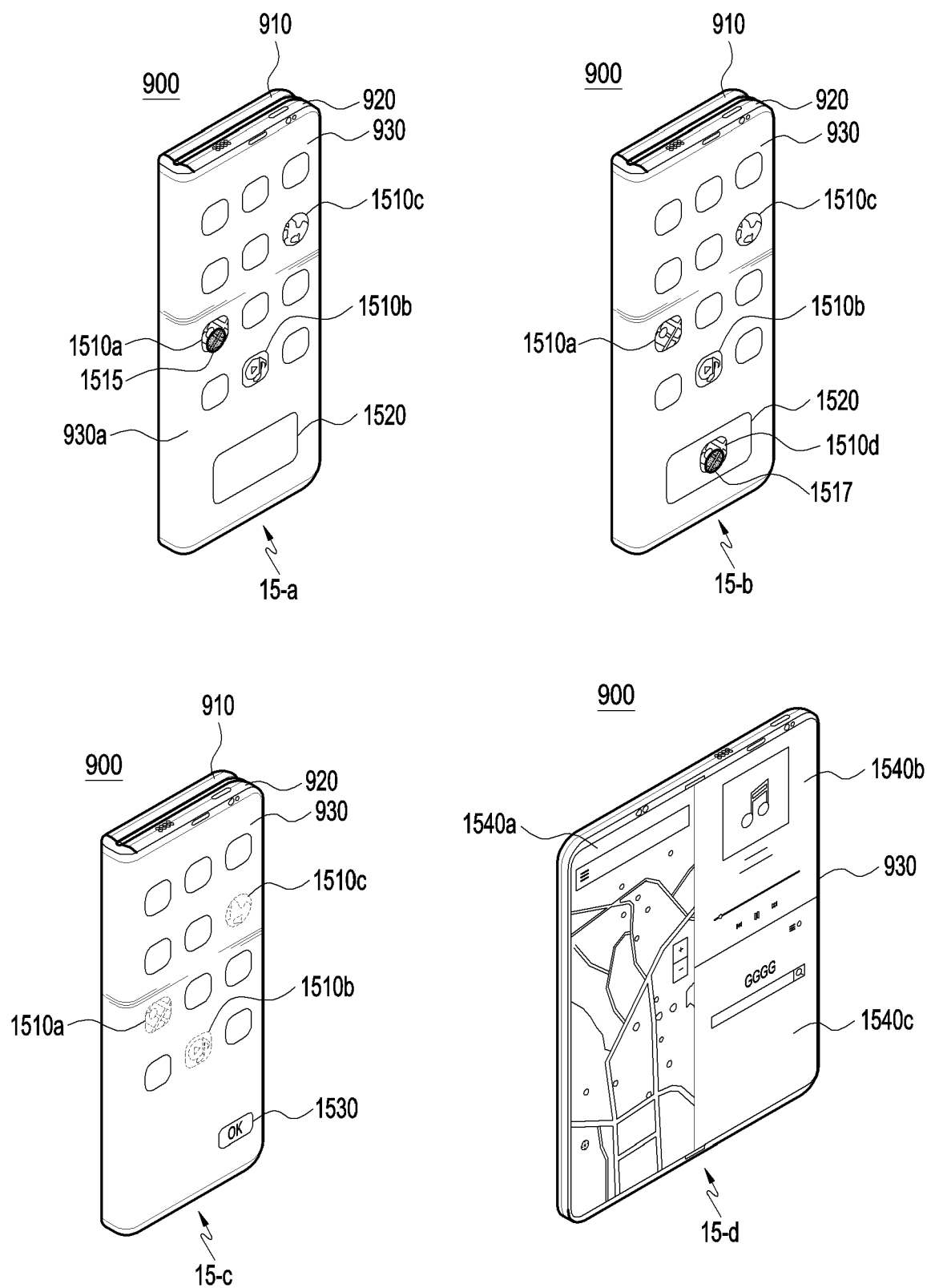
FIG. 15 is a view illustrating a method in which an electronic device simultaneously displays a plurality of applications according to an embodiment of the disclosure.

FIG. 15 is a view illustrating a method in which an electronic device simultaneously displays a plurality of applications according to an embodiment of the disclosure.

Referring to FIG. 15, an electronic device 900 may include the first housing structure 910, the second housing structure 920, and the display 930.

As shown with reference symbol 15-a to 15-c of FIG. 15, a first state of the electronic device 900 may be a state in which a middle of a display 930 is folded so that one of the first housing structure 910 is disposed to face one surface of the second housing structure 920. Further, as shown with reference symbol 15-d of FIG. 15, a second state of the electronic device 900 may be a state in which the first housing structure 910 and the second housing structure 920 are disposed flush with each other.

According to an embodiment of the disclosure, in the first state, the electronic device 900 may activate only one area of the display 930. For example, the electronic device 900 may activate only one area (i.e., the first area 930a of the display 930), which faces the ground, using an acceleration sensor or only one area of the display 930, which faces the user, using a camera sensor.

Referring to reference symbol 15-a of FIG. 15, the electronic device 900 may display a plurality of application execution objects using the activated first area 930a of the display 930 in the first state.

According to an embodiment of the disclosure, the electronic device 900 may obtain a first input to select at least one or more application execution objects from among a plurality of execution objects displayed on the display 930. The first input may be a long touch input 1515 for touching, for a predetermined time or more, one application execution object 1510a among the plurality of execution objects displayed on the display 930 which is touch input-capable.

According to an embodiment of the disclosure, the electronic device 900 may obtain a second input to request to display at least one or more applications corresponding to at least one selected application execution object.

The second input may mean, e.g., moving the selected application execution objects to a predesignated place.

According to an embodiment of the disclosure, the electronic device 900 may obtain a first input and/or a second input and, as the electronic device 900 switches from the first state to the second state, the electronic device 900 may split the display area of the display 930 and display a plurality of applications. In this case, the electronic device 900 may differentiate between applications which may be displayed in a plurality and applications which may not be displayed in a plurality.

For example, if the function of selecting a plurality of applications to be executed together on the display 930 is executed, the electronic device 900 may differentiate between application execution objects which may not be simultaneously executed and displayed with other applications and the other application execution objects and display the application execution object displayed on the display 930 in a different manner from the other application execution objects. For example, the electronic device 900 may blur the application execution object, which may not be simultaneously executed and displayed with the other applications, or display the application execution object, which may not be simultaneously executed and displayed with the other applications, only in black and white. Or, the electronic device 900 may display the application execution object, which may not be simultaneously executed and displayed with the other applications, in a different size from the other application execution objects.

According to various embodiments of the disclosure, upon attempting to move the application execution object, which may not be simultaneously executed and displayed with the other applications, to a designated area, the electronic device 900, the electronic device 900 may control to allow the application execution object not to move to the designated area or output a notification (e.g., a vibration or sound) indicating that the selected application may not be simultaneously executed and displayed with the other applications.

Referring to reference symbol 15-a of FIG. 15, in response to obtaining the first input, the electronic device 900 may display an execution object collecting area 1520 for collecting the selected application execution objects in one area of the display 930.

Referring to reference symbol 15-b of FIG. 15, in response to the user's touch-and-drag input 1517, the electronic device 900 may move the displayed object 1510d to the execution object collecting area 1520 to indicate that the selected application execution object 1510a is moving.

According to an embodiment of the disclosure, upon identifying a release of the touch on the object 1510d in the execution object collecting area 1520, the electronic device 900 may terminate the display of the object 1510d in the execution object collecting area 1520. In this case, the electronic device 900 may obtain the number of the selected application execution objects.

According to an embodiment of the disclosure, the user may select an application execution object and repeat the processing of moving to the execution object collecting area 1520. The electronic device 900 may display the application execution object selected by the user and moved to the collecting area 1520, distinctly from the other application execution objects.

Referring to reference symbol 15-c of FIG. 15, the electronic device 900 may blur the application execution objects 1510a, 1510b, and 1510c selected by the user, as compared with the other application execution objects.

According to an embodiment of the disclosure, upon obtaining the user's input to select "Ok" 1530, the electronic device 900 may identify that all the selection of the application execution object is terminated. According to various embodiments of the disclosure, the electronic device 10 may refrain from displaying an object to input a termination of selection of the application execution object, like "Ok" 1530.

According to an embodiment of the disclosure, according to a switch of the electronic device 900 from the first state to the second state, the electronic device 900 may split the display area of the display to correspond to the number of at least one or more selected application execution objects and execute and display at least one or more applications on at least one area of the display area of the display.

Referring to reference symbol 15-d of FIG. 15, the electronic device 900 may split the display area of the display 930 into a plurality of areas (e.g., three areas) based on the number of the selected application execution objects and individually display the applications. For example, the electronic device 900 may display a first application (e.g., a map application) in a first area 1540a, a second application (e.g., a music player application) in a second area 1540b, and a third application (e.g., a web browser application) in a third area 1540c.

As such, according to an embodiment of the disclosure, by using the electronic device 900 capable of using one display in the first state and the second state, at least one or more application execution objects may be selected in the first state and, in the second state, the display area of the display may be split to display applications corresponding to at least one or more selected application execution objects.

According to various embodiments of the disclosure, there may be provided various methods of selecting an application on the activated display, such as the operation of selecting a target application and then swiping it to the inactive area.

According to various embodiments of the disclosure, the electronic device 900 may execute a plurality of applications using the activated first area 930a and inactive area (not shown) of the display 930 in the first state.

For example, the electronic device 900, in the first state, may execute the application selected in response to a user input to select an execution object displayed on the activated first area 930a of the display 930 and display the same.

According to an embodiment of the disclosure, the electronic device 900, in the first state, may detect a rotation of the electronic device 900. According to a result of the detection, the electronic device 900 may activate some inactive area (not shown) of the display 930 and then display a plurality of application execution objects.

Upon detecting a switch of the electronic device 900 to the second state after at least one or more execution objects are selected from among a plurality of application execution objects, the electronic device 900 may split the display area of the display 930 and individually display the applications, based on the number of the selected application execution objects and the application executed in the first state.

Figure 16:
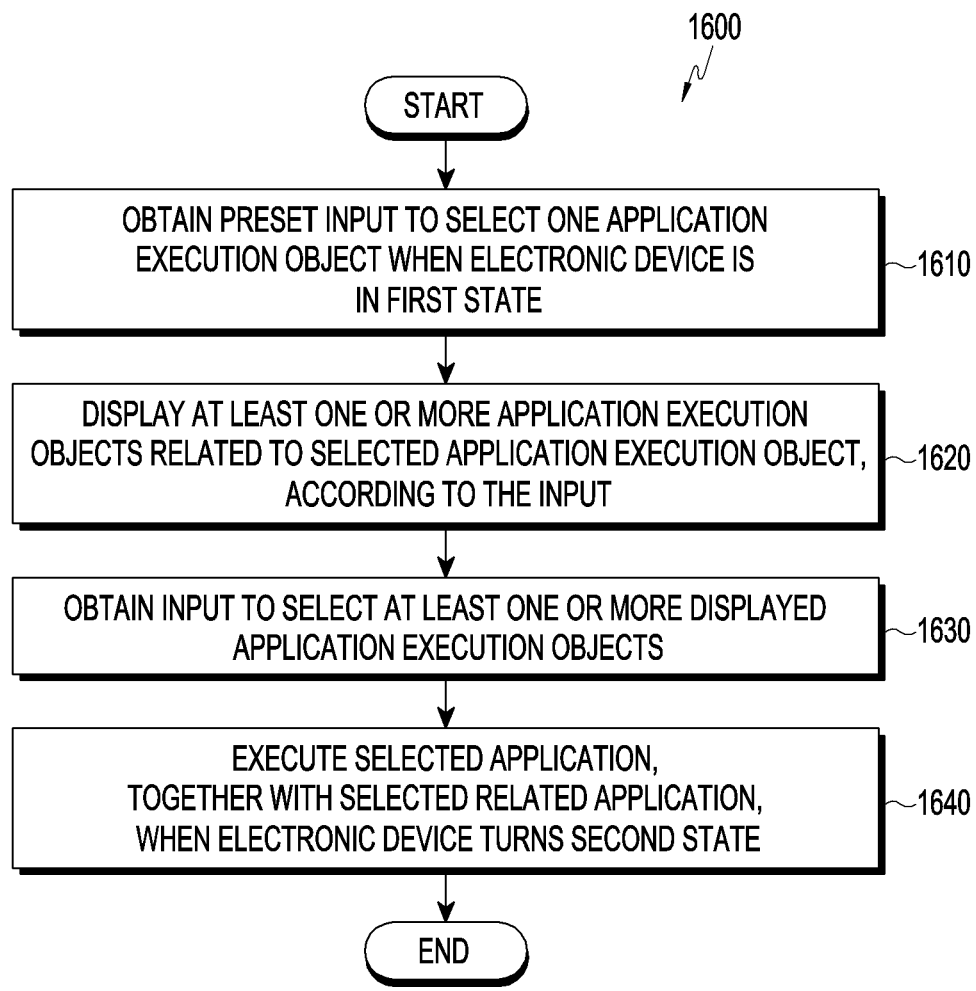
FIG. 16 is a flowchart illustrating a context in which an electronic device recommends an application execution object related to a selected application execution object according to an embodiment of the disclosure.

FIG. 16 is a flowchart 1600 illustrating a context in which an electronic device recommends an application execution object related to a selected application execution object according to an embodiment of the disclosure.

Figure 17:
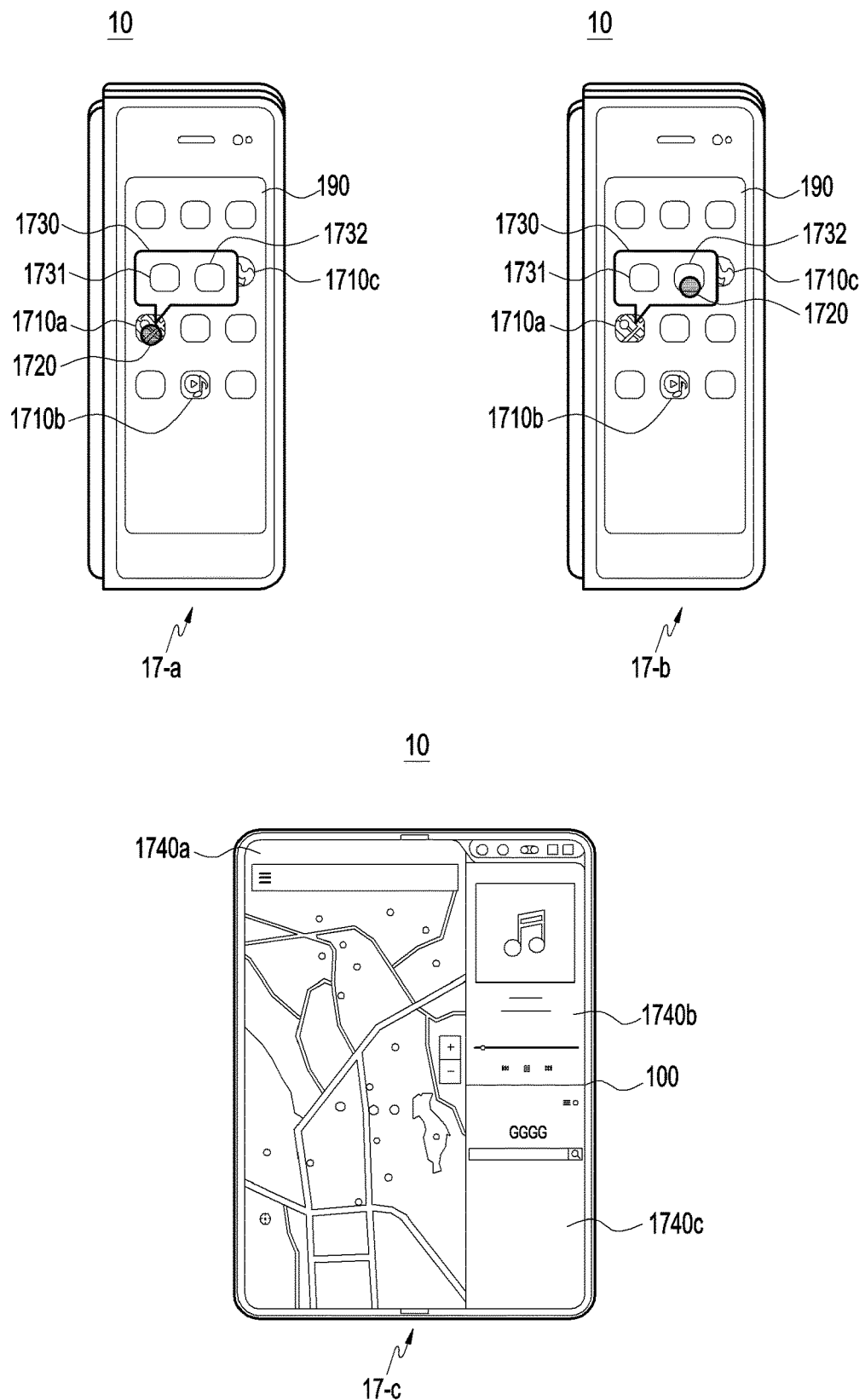
FIG. 17 is a view illustrating a context in which an electronic device recommends an application execution object related to a selected application execution object according to an embodiment of the disclosure.

FIG. 17 is a view illustrating a context in which an electronic device recommends an application execution object related to a selected application execution object according to an embodiment of the disclosure.

Referring to FIG. 16, in operation 1610, while the electronic device 10 is in the first state, the electronic device 10 may obtain a preset input to select one application execution object.

For example, referring to reference symbol 17-a of FIG. 17, the electronic device 10 may input a long touch 1720 on application execution object A 1710a among a plurality of application execution objects 1710a, 1710b, and 1710c displayed on the sub display 190.

In operation 1620, according to the input, the electronic device 10 may display at least one or more application execution objects related to the selected application execution object.

For example, referring to reference symbol 17-a of FIG. 17, the electronic device 10 may display a popup window 1730 adjacent to the selected application execution object A 1710a and display application execution object B 1731 and application execution object 1732 C, which are related to application execution object A 1710, inside the popup window 1730.

For example, if application execution object A 1710a is a first social networking service (SNS) application execution object which is most frequently used by the user, application execution object B 1731 recommended by the electronic device 10 may be a second SNS application execution object which is second most frequently used by the user, and application execution object C 1732 may be a search application execution object which has a history of having been used together with an SNS application by the user.

In operation 1630, the electronic device 10 may obtain an input to select at least one or more application execution objects displayed.

For example, referring to reference symbol 17-*b* of FIG. 17, the electronic device 10 may obtain the long touch user input 1720 to select application execution object B 1731 and application execution object C 1732. For example, the electronic device 10 may obtain a touch-and-drag input from application execution object A 1710*a* through application execution object B 1731 to application execution object C 1732.

Or, the electronic device 10 may terminate a long touch input to application execution object A 1710*a* and obtain a touch input to select application execution object B 1731 and application execution object C 1732.

In operation 1640, when the electronic device 10 turns into the second state, the electronic device 10 may execute a plurality of applications corresponding to a plurality of selected application execution objects and display them in the display area of the display.

For example, referring to reference symbol 17-*c* of FIG. 17 the electronic device 10 may display application A in the first area 1740*a* of the display area of the display 100. Further, the electronic device may display application B in the second area 1740*b* and application C in the third area 1740*c*. In this case, the electronic device 10 may determine the area where application is executed according to the order selected in operation 1630. For example, the electronic device 10 may execute application A in the first area 1740*a*, application B in the second area 1740*b*, and application C in the third area 1740*c*, based on the user's selection in the order of application execution object A 1710*a*, application execution object B 1731, and application execution object C 1732. However, the disclosure is not limited thereto.

As such, according to an embodiment of the disclosure, the electronic device 10, in the first state, may display the application execution object related to the selected application execution object and, in the second state, execute and display a plurality of applications corresponding to a plurality of application execution objects and the selected application, together.

Figure 18:
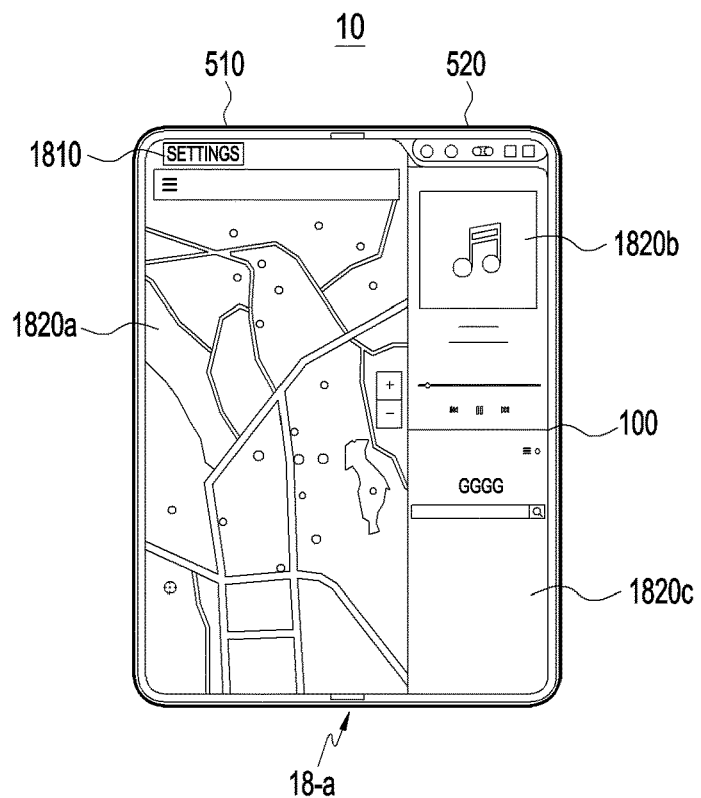
FIG. 18 is a view illustrating a context in which an electronic device stores a layout of a plurality of applications executed in a second state according to an embodiment of the disclosure.
Figure 18:
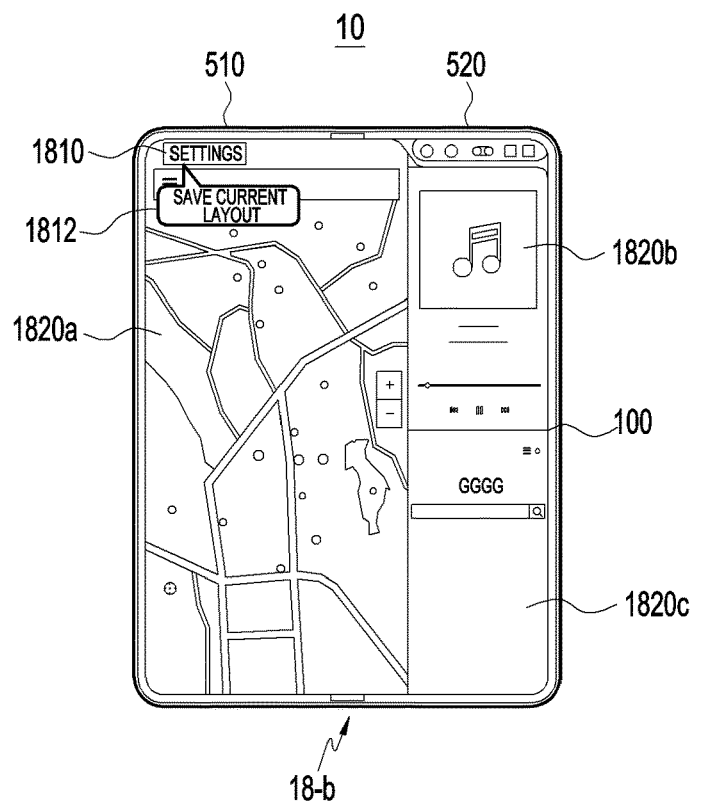

FIG. 18 is a view illustrating a context in which an electronic device stores a layout of a plurality of applications executed in a second state according to an embodiment of the disclosure.

Referring to reference symbol 18-*a* of FIG. 18, the electronic device 10 may split the display area of the display 100 into three areas and individually display the applications. For example, the electronic device 10 may display a first application (e.g., a map application) in a first area 1820*a*, a second application (e.g., a music player application) in a second area 1820*b*, and a third application (e.g., a web browser application) in a third area 1820*c*.

According to an embodiment of the disclosure, the electronic device 10 may provide a menu for configuring the functions of the electronic device 10, e.g., "settings" 1810. The user may select "settings" 1810 and enter an input as to whether to execute various functions of the electronic device 10. For example, the electronic device 10 may store the layout of the plurality of applications being executed together on the display 100.

Referring to reference symbol 18-*b* of FIG. 18, the electronic device 10 may display a popup window 1812, saying "Save the current layout" in response to a user input to select "settings" 1810. According to a user input to select the popup window 1812, the electronic device 10 may store the layout of the plurality of applications being currently displayed on the display 100.

According to various embodiments of the disclosure, the electronic device 10 may store together the angle between the first housing structure 510 and the second housing structure 520 For example, in a case where the first housing structure 510 and the second housing structure 520 are unfolded at about 180 angles, the electronic device 10 may store the layout as displaying a first application (e.g., a map application) in a first area 1820*a*, a second application (e.g., a music player application) in a second area 1820*b*, and a third application (e.g., a web browser application) in a third area 1820*c*.

Or, in a case where the first housing structure 510 and the second housing structure 520 are unfolded at about 120 degrees, the electronic device 10 may store the layout as displaying a first application (e.g., a map application) in a first area 1820*a* and merging a second area 1820 and a third area 1820*c* into a single area to display a second application (e.g., a music player application).

Figure 19:
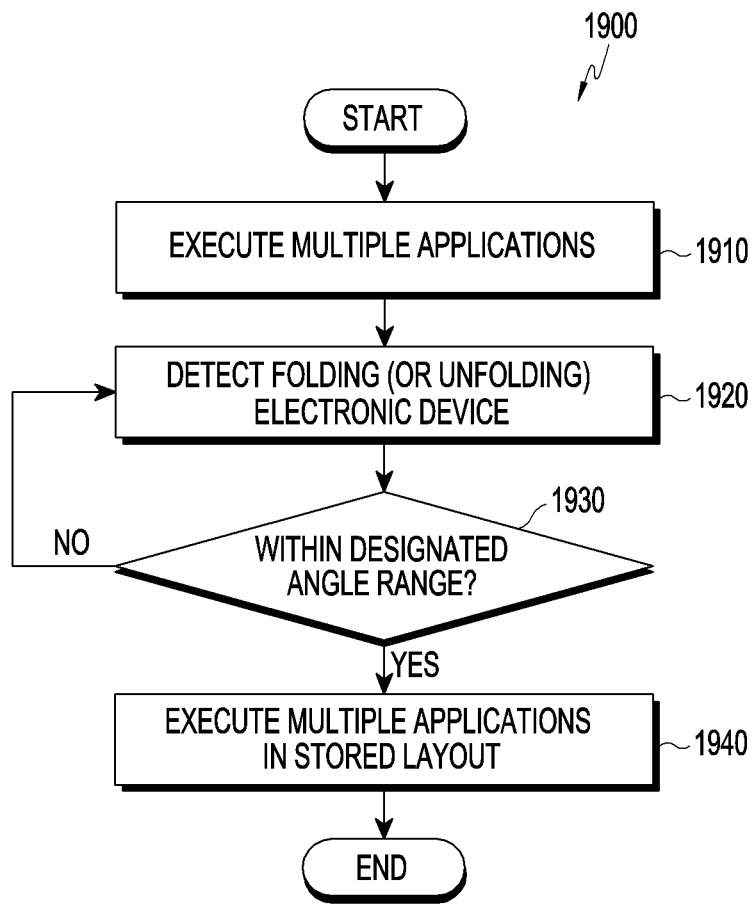
FIG. 19 is a flowchart illustrating a context in which an electronic device executes a plurality of applications according to a pre-stored application execution layout according to an embodiment of the disclosure.

FIG. 19 is a flowchart 1900 illustrating a context in which an electronic device executes a plurality of applications according to a pre-stored application execution layout according to an embodiment of the disclosure.

Figure 20:
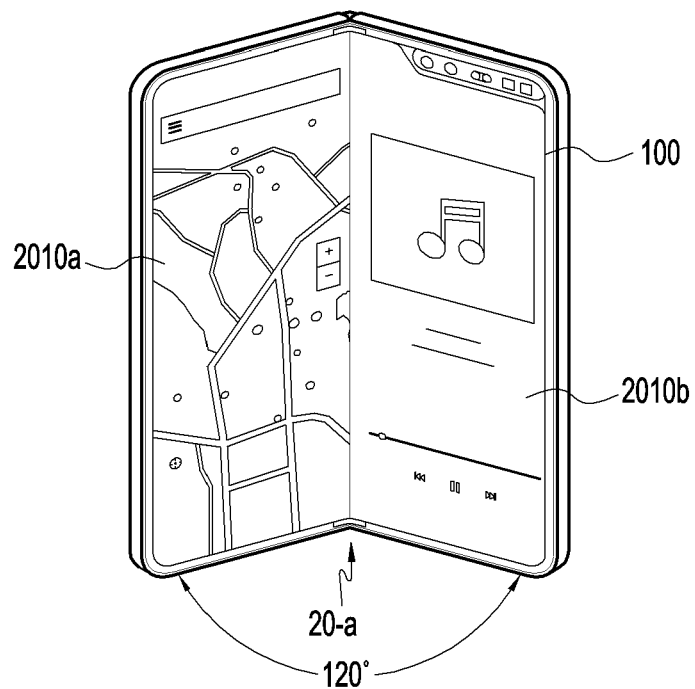
FIG. 20 is a view illustrating a context in which an electronic device executes a plurality of applications according to a pre-stored application execution layout according to an embodiment of the disclosure.
Figure 20:
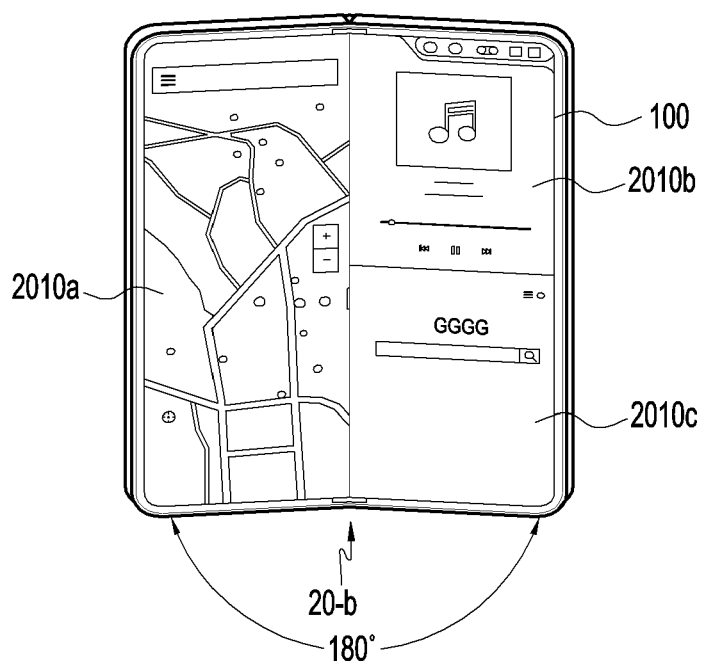

FIG. 20 is a view illustrating a context in which an electronic device executes a plurality of applications according to a pre-stored application execution layout according to an embodiment of the disclosure.

Referring to FIG. 19, in operation 1910, the electronic device 10 may execute a plurality of applications. For example, the electronic device 10 may split the display area of the display and display a plurality of applications.

In operation 1920, the electronic device 10 may detect a bending (or unfolding) of the display. For example, the electronic device 10 may detect a changing of the angle between the first housing structure and the second housing structure.

In operation 1930, the electronic device 10 may identify whether the angle of the display falls within a pre-stored angle range. For example, the electronic device 10 may obtain the angle between the first housing structure and the second housing structure using at least one or more hall sensors included in the electronic device 10 and obtain the angle of the bent (or unfolded) display.

According to an embodiment of the disclosure, the electronic device 10 may identify whether the identified angle falls within the pre-stored angle range. The pre-stored angle range may be a range from 110 degrees to 130 degrees when the pre-stored angle is, e.g., 120 degrees.

In operation 1940, if the identified angle falls within the pre-stored angle range, the electronic device 10 may execute a plurality of applications in the stored layout. Further, unless the identified angle falls within the pre-stored angle range, the electronic device 10 may perform operation 1920.

Referring to FIG. 20, the electronic device 10 may configure a different layout of a plurality of applications depending on the angle at which the display 100 is bent (or unfolded).

Referring to reference symbol 20-*a* of FIG. 20, the user may unfold the display 100 of the electronic device 10 at about 120 degrees. The electronic device 10 may obtain information about the layout of the plurality of applications stored corresponding to the case where the display 100 is bent at 120 degrees and display on the display 100. For example, the electronic device 10 may display a map application at the left side 2010*a* of the display 100 and a music player application at the right side 2010*b*.

Referring to reference symbol 20-*b* of FIG. 20, the user may unfold the display 100 of the electronic device 10 at about 180 degrees. The electronic device 10 may obtain information about the layout of the plurality of applications stored corresponding to the case where the display 100 is bent at 180 degrees and display on the display 100. For example, the electronic device 10 may display a map application at the left side 2010*a* of the display 100 and display a music player application on an upper side 2010*c* of the right side 2010*b* of the display 100 and a web search application in a lower side 2010*d* of the right side 2010*b*.

As such, according to an embodiment of the disclosure, the electronic device 10 may store information about a layout for simultaneously executing a plurality of applications on the display 100 and provide it in response to the user's input.

Figure 21:
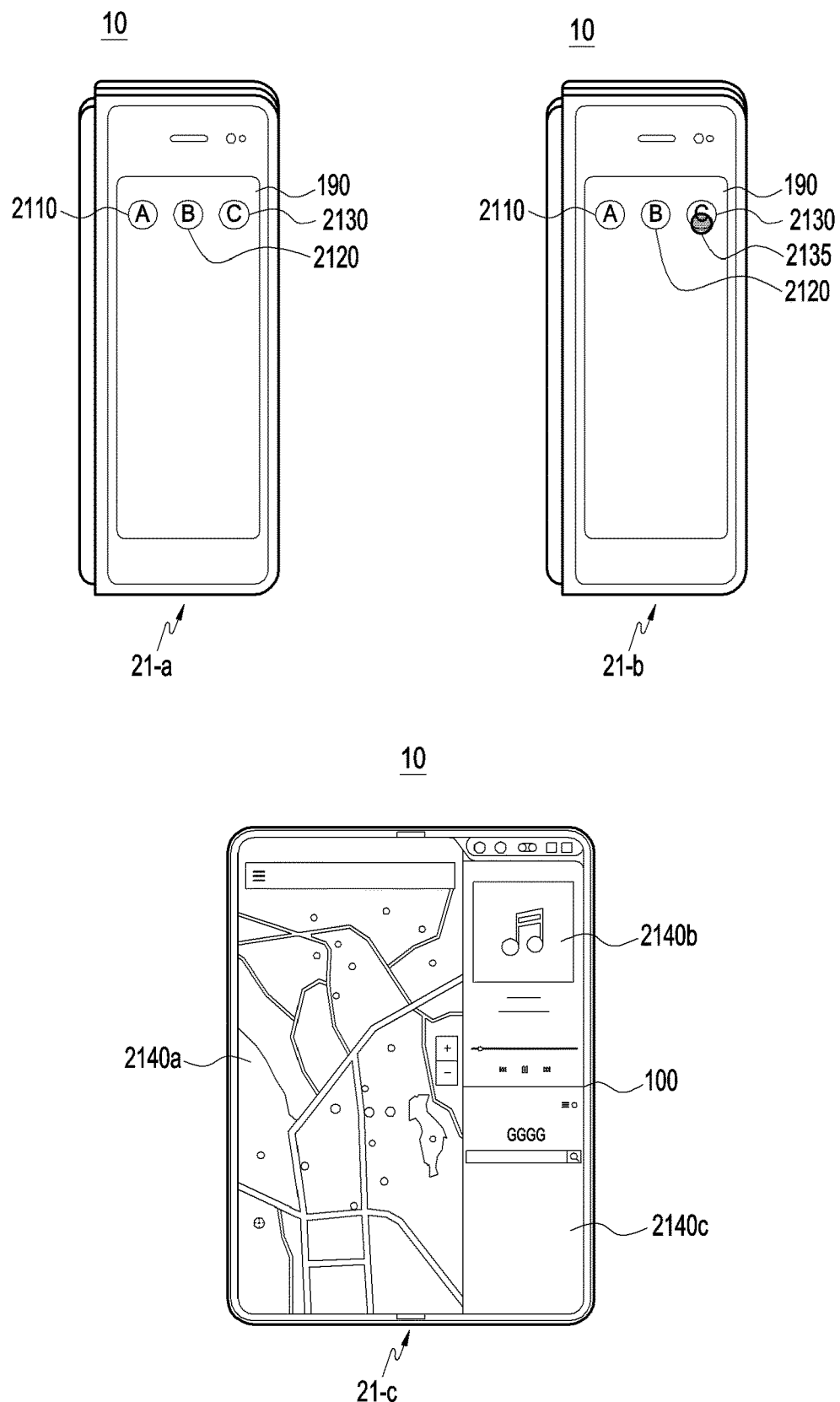
FIG. 21 is a view illustrating a context in which an electronic device executes a plurality of applications according to a pre-stored application execution layout according to an embodiment of the disclosure.

FIG. 21 is a view illustrating a context in which an electronic device executes a plurality of applications according to a pre-stored application execution layout according to an embodiment of the disclosure.

Referring to reference symbol 21-*a* of FIG. 21, the electronic device 10 may display execution objects (e.g., A 2110, B 2120, and C 2130) to execute at least one or more pre-stored display layouts in one area of the sub display 190 in the first state. The execution objects may individually correspond to the pre-stored layouts.

For example, the electronic device 10 may divide the display 100 into an upper and lower area, corresponding to execution object "A" 2110 and display a map application in the upper area and a web search application in the lower area.

In this case, if the user selects "A" 2110 and switches the state of the electronic device 10 into the second state, the electronic device 10 may activate the display 100, split the display area into an upper and lower area, and execute and display a map application in the upper area and execute and display a web search application in the lower area.

Referring to reference symbol 21-*b* of FIG. 21, the electronic device 10 may obtain a user input 2135 to select "C" 2130 from among the execution objects.

The electronic device 10 may read in information about the layout of a plurality of applications on the display, which has been stored corresponding to "C" 2130. For example, execution object "C" 2130 may be a state in which the display 100 is split into three areas where a map application, a music player application, and a web search application are individually executed.

Referring to reference symbol 21-*c* of FIG. 21, the electronic device 10 may detect a switch of the electronic device 10 from the first state to the second state, activate the display 100, and execute and display a plurality of applications.

For example, the electronic device 10 may split the display 100 into three areas corresponding to execution object "C" 2130. The electronic device 10 may execute and display a map application in the first area 2140*a*, execute and display a music player application in the second area 2140*b*, and execute and display a web search application in the third area 2140*c*.

Figure 22:
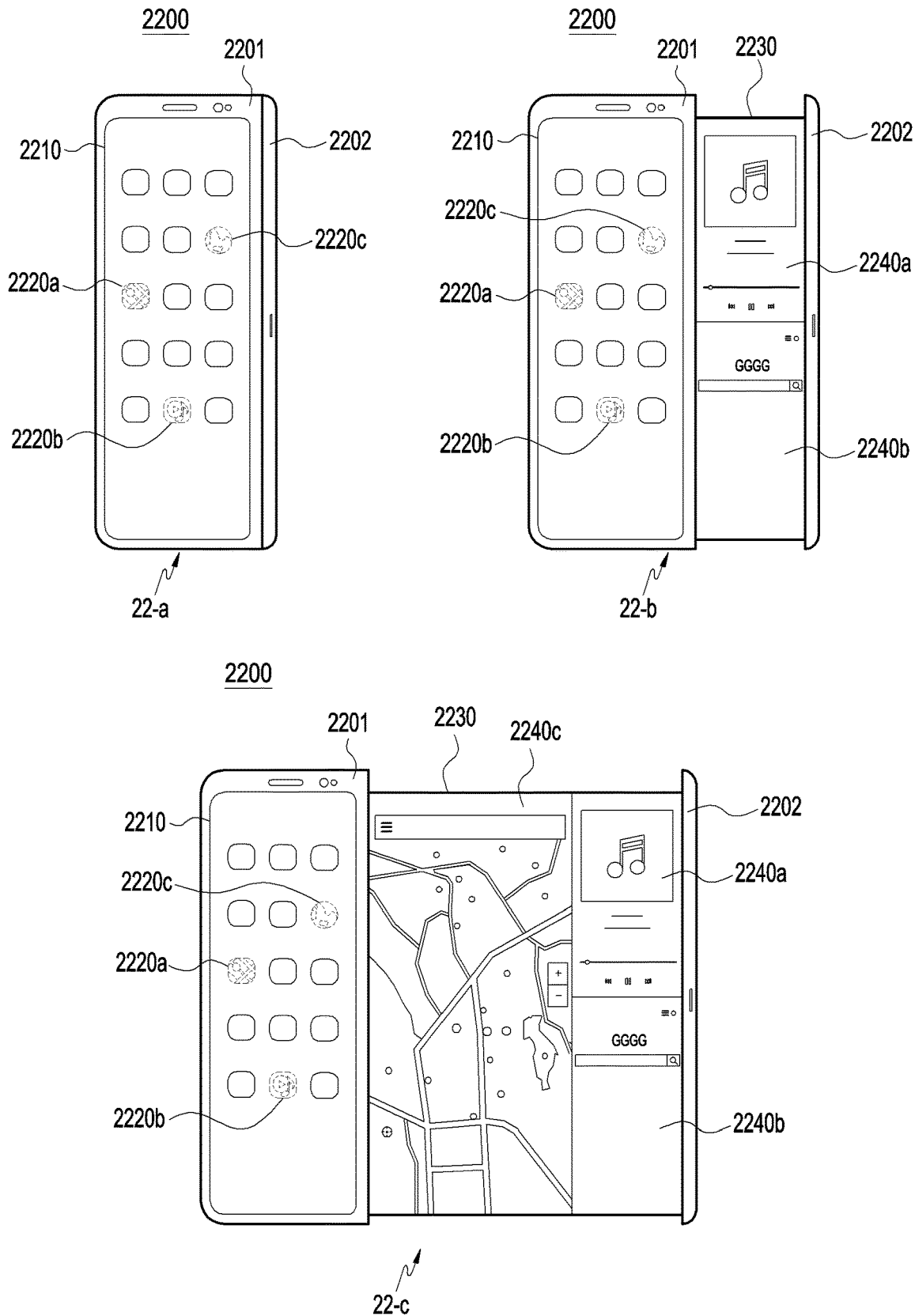
FIG. 22 is a view illustrating a context in which an electronic device executes a plurality of applications according to another embodiment of the disclosure.

FIG. 22 is a view illustrating a context in which an electronic device executes a plurality of applications according to another embodiment of the disclosure.

Referring to FIG. 22, an electronic device 2200 may include a body 2201, a display 2230, a sub display 2210, and a moving unit 2202. However, embodiments of the disclosure are not limited thereto. The electronic device 2200 may further include a plurality of components or exclude some components. The display 2230 may be a rollable display which may be partially folded or bent.

Referring to reference symbol 22-*a* of FIG. 22, in a first state where the body 2201 and the moving unit 2202 are positioned most adjacent to each other, the electronic device 2200 may hide the display behind the body 2201 and activate the sub display 2210.

According to an embodiment of the disclosure, the electronic device 2200 may display a plurality of application execution objects on the sub display 2210. The electronic device 2200 may obtain an external input to select at least one or more application execution objects 2220*a*, 2220*b*, or 2220*c* from among a plurality of application execution objects displayed on the sub display 2210 within a preset time (e.g., 5 to 7 seconds).

According to an embodiment of the disclosure, the electronic device 2200 may display the application execution object selected by the user, distinctly from the other application execution objects. For example, the electronic device 10 may blur the application execution objects 2220*a*, 2220*b*, and 2220*c* selected by the user, as compared with the other application execution objects.

According to an embodiment of the disclosure, according to a switch of the electronic device 2200 from the first state to the second state, the electronic device 10 may execute and display at least one or more applications on at least one area of the display area of the display.

The second state may be, e.g., a state in which at least a portion of the display 2230 inside the body 2201 is exposed to the outside of the body 2201.

Referring to reference symbol 22-*b* of FIG. 22, the electronic device 2200 may split an area of the display 2230, exposed to the outside of the body 2201, into two areas and execute and display applications 2240*a* and 2240*b* corresponding to selected application execution objects. In this case, corresponding to exposure of only some portion of the display 2230 to the outside of the body 2201, the electronic device 2200 may first display applications 2240*a* and 2240*b* corresponding to two application execution objects among the three selected application execution objects.

Referring to reference symbol 22-*c* of FIG. 22, corresponding to exposure of the entire display 2230 to the outside of the body 2201, the electronic device 2200 may execute and display three applications 2240*a*, 2240*b*, and 2240*c* corresponding to the three selected application execution objects.

According to various embodiments of the disclosure, the electronic device 2200 may display some applications of the three applications 2240*a*, 2240*b*, and 2240*c* corresponding to the three selected application execution objects on the sub display 2210.

As such, according to an embodiment of the disclosure, the electronic device 2200 may change the number of applications displayed on the display, corresponding to the size of the activated display.

Figure 23:
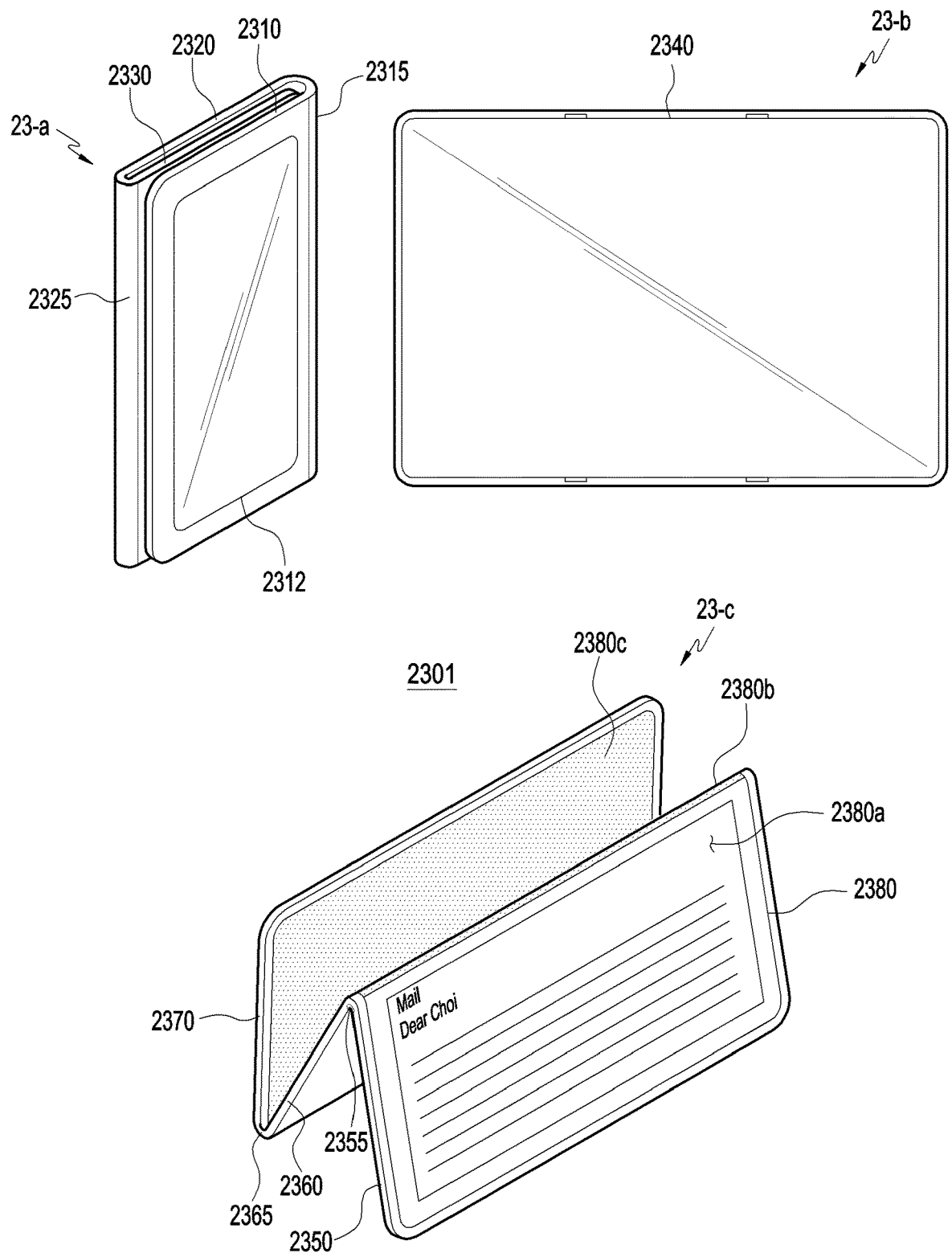
FIG. 23 is a view illustrating a context in which a plurality of applications are executed using an electronic device according to another embodiment of the disclosure.

FIG. 23 is a view illustrating a context in which a plurality of applications are executed using an electronic device 2300 according to another embodiment of the disclosure.

Referring to FIG. 23, an electronic device 2300 may include a first housing structure 2310, a second housing structure 2320, a third housing structure 2330, a first hinge cover 2315, a second hinge cover 2325, a sub display 2312, and a display 2340.

According to an embodiment of the disclosure, the first hinge cover 2315 may cover the foldable portion between the first housing structure 2310 and the second housing structure 2320. Further, the second hinge cover 2325 may cover the foldable portion between the second housing structure 2320 and the third housing structure 2330.

According to an embodiment of the disclosure, in the electronic device 2300, the first housing structure 2310, the second housing structure 2320, and the third housing structure 2330 may be in the folded state as shown with reference symbol 23-*a* of FIG. 23 or in the unfolded state as shown with reference symbol 23-*b* of FIG. 23.

Referring to reference symbol 23-*a* of FIG. 23, the electronic device 2300 may activate the sub display 2312 in the folded state. For example, the electronic device 2300 may display a plurality of application execution objects using the sub display 2312, in the same or similar manner as that described above and obtain a user input. Or, the electronic device 2300 may obtain a user input to split the display area of the display 2340 using the sub display 2312.

Referring to reference symbol 23-*b* of FIG. 23, the electronic device 2300 may be in the unfolded state where the first housing structure 2310, the second housing structure 2320, and the third housing structure 2330 are spread out flush with each other. In this case, the electronic device 2300 may activate the display 2340, split the display area, and, as described above, execute a plurality of applications together.

Reference symbol 23-*c* of FIG. 23 illustrates another embodiment in which the folded state of the electronic device 2301 is different from that of reference symbol 23-*a*.

Referring to reference symbol 23-*c* of FIG. 23, an electronic device 2301 may include a first housing structure 2350, a second housing structure 2360, a third housing structure 2370, a first hinge cover 2355, a second hinge cover 2365, and a display 2380. As compared with the electronic device 2300 of reference symbol 23-*a*, the electronic device 2301 may have a different folded state.

According to an embodiment of the disclosure, the electronic device 2301 may activate some area of the display 2380 in the folded state. For example, the electronic device 2301 may execute and display an application in the first display area 2380 prepared in the first housing structure 2350 of the display area of the display 2380 in the inactive state of the third display area 2380*c* included in the third housing structure 2370 of the display area of the display 2380 and the second display area 2380*b* included in the second housing structure 2360 of the display area of the display 2380, with the second housing structure 2360 and the third housing structure 2370 adjacent to each other.

Figure 24:
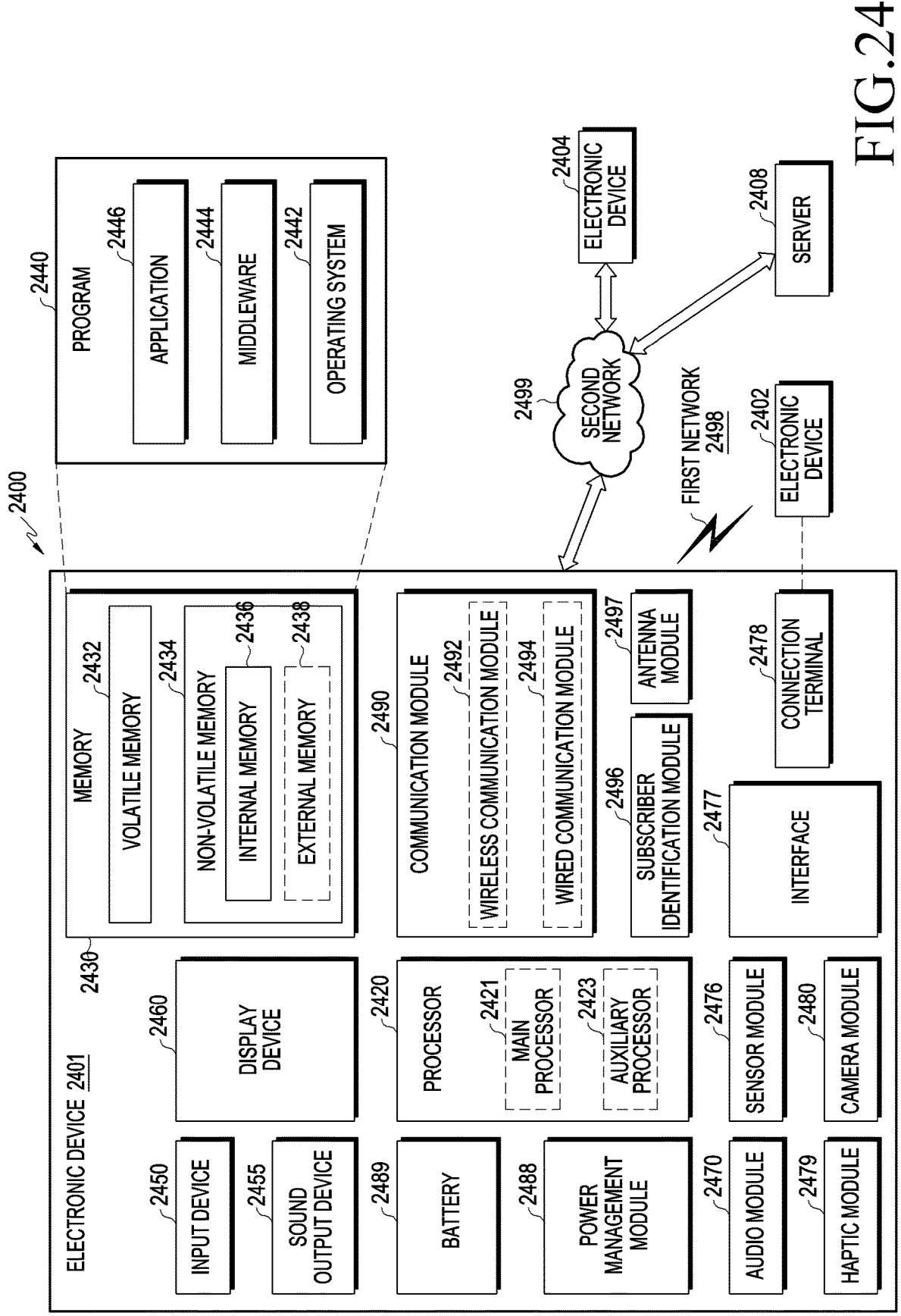
FIG. 24 is a block diagram illustrating an electronic device in a network environment according to an embodiment of the disclosure.

FIG. 24 is a block diagram illustrating an electronic device 2401 in a network environment 2400 according to an embodiment of the disclosure.

Referring to FIG. 24, an electronic device 2401 may include the electronic device 10 of FIG. 1, the electronic device 900 of FIG. 9, the electronic device 2240 of FIG. 22, and the electronic device 2300 of FIG. 23.

Referring to FIG. 24, the electronic device 2401 in the network environment 2400 may communicate with an electronic device 2402 via a first network 2498 (e.g., a short-range wireless communication network), or an electronic device 2404 or a server 2408 via a second network 2499 (e.g., a long-range wireless communication network). According to an embodiment, the electronic device 2401 may communicate with the electronic device 2404 via the server 2408. According to an embodiment, the electronic device 2401 may include a processor 2424, memory 2430, an input device 2450, a sound output device 2455, a display device 2460, an audio module 2470, a sensor module 2476, an interface 2477, a haptic module 2479, a camera module 2480, a power management module 2488, a battery 2489, a communication module 2490, a subscriber identification module (SIM) 2496, or an antenna module 2497. In some embodiments, at least one (e.g., the display device 2460 or the camera module 2480) of the components may be omitted from the electronic device 2401, or one or more other components may be added in the electronic device 2401. In some embodiments, some of the components may be implemented as single integrated circuitry. For example, the sensor module 2476 (e.g., a fingerprint sensor, an iris sensor, or an illuminance sensor) may be implemented as embedded in the display device 2460 (e.g., a display).

The processor 2424 may execute, for example, software (e.g., a program 2440) to control at least one other component (e.g., a hardware or software component) of the electronic device 2401 coupled with the processor 2424, and may perform various data processing or computation. According to one embodiment, as at least part of the data processing or computation, the processor 2424 may load a command or data received from another component (e.g., the sensor module 2476 or the communication module 2490) in volatile memory 2432, process the command or the data stored in the volatile memory 2432, and store resulting data in non-volatile memory 2434. According to an embodiment, the processor 2424 may include a main processor 2421 (e.g., a central processing unit (CPU) or an application processor (AP)), and an auxiliary processor 2423 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 2423 may be adapted to consume less power than the main processor 2421, or to be specific to a specified function. The auxiliary processor 2423 may be implemented as separate from, or as part of the main processor 2421.

The auxiliary processor 2423 may control at least some of functions or states related to at least one component (e.g., the display device 2460, the sensor module 2476, or the communication module 2490) among the components of the electronic device 2401, instead of the main processor 2421 while the main processor 2421 is in an inactive (e.g., sleep) state, or together with the main processor 2421 while the main processor 2421 is in an active state (e.g., executing an application). According to an embodiment, the auxiliary processor 2423 (e.g., an image signal processor or a communication processor) may be implemented as part of another component (e.g., the camera module 2480 or the communication module 2490) functionally related to the auxiliary processor 123.

The memory 2430 may store various data used by at least one component (e.g., the processor 2424 or the sensor module 2476) of the electronic device 2401. The various data may include, for example, software (e.g., the program 2440) and input data or output data for a command related thereto. The memory 2430 may include the volatile memory 2432 or the non-volatile memory 2434.

The program 2440 may be stored in the memory 2430 as software, and may include, for example, an operating system (OS) 2442, middleware 2444, or an application 2446.

The input device 2450 may receive a command or data to be used by other component (e.g., the processor 2424) of the electronic device 2401, from the outside (e.g., a user) of the electronic device 2401. The input device 2450 may include, for example, a microphone, a mouse, a keyboard, or a digital pen (e.g., a stylus pen).

The sound output device 2455 may output sound signals to the outside of the electronic device 2401. The sound output device 2455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2460 may visually provide information to the outside (e.g., a user) of the electronic device 2401. The display device 2460 may include, for example, a display, a hologram device, or a projector and control circuitry to control a corresponding one of the display, hologram device, and projector. According to an embodiment, the display device 2460 may include touch circuitry adapted to detect a touch, or sensor circuitry (e.g., a pressure sensor) adapted to measure the intensity of force incurred by the touch.

The audio module 2470 may convert a sound into an electrical signal and vice versa. According to an embodiment, the audio module 2470 may obtain the sound via the input device 2450, or output the sound via the sound output device 2455 or a headphone of an external electronic device (e.g., an electronic device 2402) directly (e.g., wiredly) or wirelessly coupled with the electronic device 2401.

The sensor module 2476 may detect an operational state (e.g., power or temperature) of the electronic device 2401 or an environmental state (e.g., a state of a user) external to the electronic device 2401, and then generate an electrical signal or data value corresponding to the detected state. According to an embodiment, the sensor module 2476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2477 may support one or more specified protocols to be used for the electronic device 2401 to be coupled with the external electronic device (e.g., the electronic device 2402) directly (e.g., wiredly) or wirelessly. According to an embodiment, the interface 2477 may include, for example, a high definition multimedia interface (HDMI), a universal serial bus (USB) interface, a secure digital (SD) card interface, or an audio interface.

A connecting terminal 2478 may include a connector via which the electronic device 2401 may be physically connected with the external electronic device (e.g., the electronic device 2402). According to an embodiment, the connecting terminal 2478 may include, for example, a HDMI connector, a USB connector, a SD card connector, or an audio connector (e.g., a headphone connector).

The haptic module 2479 may convert an electrical signal into a mechanical stimulus (e.g., a vibration or motion) or electrical stimulus which may be recognized by a user via his tactile sensation or kinesthetic sensation. According to an embodiment, the haptic module 2479 may include, for example, a motor, a piezoelectric element, or an electric stimulator.

The camera module 2480 may capture a still image or moving images. According to an embodiment, the camera module 2480 may include one or more lenses, image sensors, image signal processors, or flashes.

The power management module 2488 may manage power supplied to the electronic device 2401. According to one embodiment, the power management module 2488 may be implemented as at least part of, for example, a power management integrated circuit (PMIC).

The battery 2489 may supply power to at least one component of the electronic device 2401. According to an embodiment, the battery 2489 may include, for example, a primary cell which is not rechargeable, a secondary cell which is rechargeable, or a fuel cell.

The communication module 2490 may support establishing a direct (e.g., wired) communication channel or a wireless communication channel between the electronic device 2401 and the external electronic device (e.g., the electronic device 2402, the electronic device 2404, or the server 2408) and performing communication via the established communication channel. The communication module 2490 may include one or more communication processors that are operable independently from the processor 2420 (e.g., the application processor (AP)) and supports a direct (e.g., wired) communication or a wireless communication. According to an embodiment, the communication module 2490 may include a wireless communication module 2492 (e.g., a cellular communication module, a short-range wireless communication module, or a global navigation satellite system (GNSS) communication module) or a wired communication module 2494 (e.g., a local area network (LAN) communication module or a power line communication (PLC) module). A corresponding one of these communication modules may communicate with the external electronic device via the first network 2498 (e.g., a short-range communication network, such as Bluetooth™, wireless-fidelity (Wi-Fi) direct, or infrared data association (IrDA)) or the second network 2499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2492 may identify and authenticate the electronic device 2401 in a communication network, such as the first network 2498 or the second network 2499, using subscriber information (e.g., international mobile subscriber identity (IMSI)) stored in the subscriber identification module 2496.

The antenna module 2497 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 2497 may include a plurality of antennas. In this case, at least one antenna appropriate for a communication scheme used in a communication network, such as the first network 2498 or the second network 2499, may be selected from the plurality of antennas by, e.g., the communication module 2490. The signal or the power may then be transmitted or received between the communication module 2490 and the external electronic device via the selected at least one antenna. According to an embodiment, other parts (e.g., radio frequency integrated circuit (RFIC)) than the radiator may be further formed as part of the antenna module 2497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 2401 and the external electronic device 2404 via the server 2408 coupled with the second network 2499. The external electronic devices 2402 or 2404 each may be a device of the same or a different type from the electronic device 2401. According to an embodiment, all or some of operations to be executed at the electronic device 2401 may be executed at one or more of the external electronic devices 2402, 2404, or 2408. For example, if the electronic device 2401 should perform a function or a service automatically, or in response to a request from a user or another device, the electronic device 2401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2401. The electronic device 2401 may provide the outcome, with or without further processing of the outcome, as at least part of a reply to the request. To that end, a cloud computing, distributed computing, or client-server computing technology may be used, for example.

An Example 1 of the disclosure may be an electronic device, wherein the electronic device may include at least one display, at least one processor, and at least one memory, wherein the at least one memory stores instructions configured to, when executed, enable the at least one processor to obtain, through a first display area of the at least one display activated while the at least one display is folded, an input to select a plurality of applications to be executed and displayed when the at least one display is unfolded, detect an unfolding of the at least one display, based on the detection of the unfolding, split a second display area of the at least one display activated while the at least one display is unfolded to correspond to the number of the plurality of applications, and execute the plurality of applications and display the plurality of applications on the split second display area.

An Example 2 may be an electronic device in accordance with example 1, or with any other example described herein, wherein the at least one display includes a first display and a second display, the second display displaying a plurality of application execution objects for executing the plurality of applications in a folded state of the first display, and wherein the instructions are configured to enable the at least one processor to determine an area, to display the plurality of applications, among a display area of the first display when the first display is unfolded, based on an order in which an application execution object among the plurality of application execution objects displayed on the second display is selected.

An Example 3 may be an electronic device in accordance with example 1 or example 2, or with any other example described herein, wherein the at least one display includes a first display and a second display displaying a plurality of application execution objects for executing the plurality of applications in a folded state of the first display, and wherein the instructions are configured to enable the at least one processor to determine an area, to display the plurality of applications, among a display area of the first display when the first display is unfolded, based on a time when an application execution object among the plurality of application execution objects displayed on the second display is touched.

An Example 4 may be an electronic device in accordance with example 1 to example 3, or with any other example described herein, wherein the at least one display includes a first display and a second display displaying a plurality of application execution objects for executing the plurality of applications in a folded state of the first display, and wherein the instructions are configured to enable the at least one processor to deactivate the second display upon detecting a switch of the first display from the folded state to the unfolded state.

An Example 5 may be an electronic device in accordance with example 1 to example 4, or with any other example described herein, wherein the at least one display includes a first display and a second display displaying a plurality of application execution objects for executing the plurality of applications in a folded state of the first display, and wherein the instructions are configured to enable the at least one processor to determine a form in which a display area of the first display is split, based on a touch-and-drag input on the second display.

An Example 6 may be an electronic device in accordance with example 1 to example 5, or with any other example described herein, wherein the instructions are configured to enable the at least one processor to obtain a first input to select a plurality of application execution objects in a first state in which at least part of the at least one display is folded, obtain a second input to request to execute and display the plurality of applications, corresponding to the plurality of selected application execution objects, on the at least one display, detect a switch from the first state to a second state in which the at least one display is unfolded, split the second display area of the at least one display to correspond to the number of the plurality of selected application execution objects, according to detecting the switch to the second state, execute and display the plurality of applications on the split second display area.

An Example 7 may be an electronic device in accordance with example 1 to example 6, or with any other example described herein, wherein the at least one display includes a first display and a second display displaying the application execution objects in the folded state of the first display, wherein the instructions are configured to enable the at least one processor to identify the first input based on touching one of the application execution objects displayed on the second display for a predetermined time, and identify the second input based on moving the plurality of selected application execution objects to a designated position.

An Example 8 may be an electronic device in accordance with example 1 to example 7, or with any other example described herein, further comprising a first housing structure and a second housing structure, wherein the instructions are configured to enable the at least one processor to identify that a state in which one surface of the first housing structure is disposed to face one surface of the second housing structure is the first state and identify that a state in which the first housing structure and the second housing structure are disposed to face in the same direction is the second state.

An Example 9 may be an electronic device in accordance with example 1 to example 8, or with any other example described herein, wherein the instructions are configured to enable the at least one processor to store, in the at least one memory, a layout of the plurality of applications displayed on the second display area.

An Example 10 may be an electronic device in accordance with example 1 to example 9, or with any other example described herein, wherein the instructions are configured to enable the at least one processor to store, in the at least one memory, information related to an angle at which the display is folded, along with the layout of the plurality of applications displayed on the second display area.

An Example 11 may be an electronic device in accordance with example 1 to example 10, or with any other example described herein, wherein the instructions are configured to enable the at least one processor to control the at least one display in response to an external input to execute and display the plurality of applications according to the stored layout.

An Example 12 of the disclosure may be an operation method, wherein the operation method includes obtaining, through a first display area of at least one display of the electronic device activated while the at least one display is folded, an input to select a plurality of applications to be executed and displayed when the at least one display is unfolded, detecting an unfolding of the at least one display, based on the detection of the unfolding, split a second display area of the at least one display activated while the at least one display is unfolded to correspond to the number of the plurality of applications, and executing the plurality of applications and displaying the plurality of applications on the split second display area.

An Example 13 may be an operation method in accordance with example 12, or with any other example described herein, wherein the at least one display includes a first display and a second display, the second display displaying a plurality of application execution objects for executing the plurality of applications in a folded state of the first display, and wherein the method of controlling the electronic device comprises determining an area, to display the plurality of applications, among a display area of the first display when the first display is unfolded, based on an order in which an application execution object among the plurality of application execution objects displayed on the second display is selected.

An Example 14 may be an operation method in accordance with example 12 or example 13, or with any other example described herein, wherein the at least one display includes a first display and a second display, the second display displaying a plurality of application execution objects for executing the plurality of applications in a folded state of the first display, and wherein the method of controlling the electronic device comprises determining an area, to display the plurality of applications, among a display area of the first display when the first display is unfolded, based on a time when an application execution object among the plurality of application execution objects displayed on the second display is touched.

An Example 15 may be an operation method in accordance with example 12 to example 14, or with any other example described herein, wherein, wherein the at least one display includes a first display and a second display, the second display displaying a plurality of application execution objects for executing the plurality of applications in a folded state of the first display, and wherein the method of controlling the electronic device comprises determining a form in which a display area of the first display is split, based on a touch-and-drag input on the second display.

An Example 16 of the disclosure may be an electronic device, wherein the electronic device may include a display, at least part of the display being folded, at least one processor, and at least one memory, wherein the at least one memory stores instructions to, when executed, enable the at least one processor to obtain an input to select a plurality of applications, in a folded state of the display, store data related to the plurality of applications in a frame buffer included in the at least one memory, based on the input, in the folded state of the display, obtain an event in which the display switches from the folded state to an unfolded state, and display the data stored in the frame buffer, related to the plurality of applications, through the display, based on obtaining the event.

An Example 17 may be an electronic device in accordance with example 16, or with any other example described herein, wherein the at least processor select the plurality of applications based on at least one of an order of the input to select the plurality of applications, a strength of the input, a direction of the input, or duration of the input.

An Example 18 may be an electronic device in accordance with example 16 or example 17, or with any other example described herein, wherein an attribute of the plurality of applications includes at least one of the number of the selected applications, a type of the selected application, or a display history of the selected application.

An Example 19 may be an electronic device in accordance with example 16 to example 18, or with any other example described herein, wherein the data obtained related to the plurality of applications is displayed on at least a portion of a display area of the display split to correspond to the number of the plurality of applications.

An Example 20 of the disclosure may be an electronic device, wherein the electronic device may include at least one display, at least one processor, and at least one memory, wherein the at least one memory stores instructions to, when executed, enable the at least one processor to obtain, through a display area activated while the at least one display is folded, an input to determine a layout of a plurality of applications to be executed and displayed when the at least one display is unfolded, obtain, through the display area, an input to select the plurality of applications to be executed and displayed when the at least one display is unfolded, detect an unfolding of the at least one display, and display the plurality of applications on the split display area according to the layout, based on the detection.

An Example 21 may be an electronic device in accordance with example 20, or with any other example described herein, wherein the instructions are configured to enable the at least one processor to determine the layout to split the display area of the at least one display, based on a touch-and-drag input on the activated display area.

An Example 22 may be an electronic device in accordance with example 20 or example 21, or with any other example described herein, wherein the at least one display includes a first display and a second display, the second display displaying a plurality of application execution objects for executing the plurality of applications in a folded state of the first display, and wherein the instructions are configured to enable the at least one processor to determine the layout to split the display area of the first display, based on a touch-and-drag input on the second display.

An Example 23 of the disclosure may be an electronic device, wherein the electronic device may include at least one displaying means (e.g. a display, a touchscreen, etc), at least one processing means (e.g. a processor, an application processor, etc), and at least one storage means (e.g., a memory, a memory chip, a memory card, etc), wherein the at least one storage means stores instructions configured to, when executed, enable the at least one processing means to obtain, through a first display area of the at least one displaying means activated while the at least one displaying means is folded, an input to select a plurality of applications to be executed and displayed when the at least one displaying means is unfolded, detect an unfolding of the at least one displaying means, based on the detection of the unfolding, split a second display area of the at least one displaying means activated while the at least one display is unfolded to correspond to the number of the plurality of applications, and execute the plurality of applications and display the plurality of applications on the split second display area.

An Example 24 may be an electronic device in accordance with example 23, or with any other example described herein, wherein the at least one displaying means include a first displaying means and a second displaying means, the second displaying means displaying a plurality of application execution objects for executing the plurality of applications in a folded state of the first displaying means, and wherein the instructions are configured to enable the at least one processing means to determine an area, to display the plurality of applications, among a display area of the first displaying means when the first displaying means is unfolded, based on an order in which an application execution object among the plurality of application execution objects displayed on the second displaying means is selected.

An Example 25 may be an electronic device in accordance with example 23 or example 24, or with any other example described herein, wherein the at least one displaying means include a first displaying means and a second displaying means displaying a plurality of application execution objects for executing the plurality of applications in a folded state of the first displaying means, and wherein the instructions are configured to enable the at least one processing means to determine an area, to display the plurality of applications, among a display area of the first displaying means when the first displaying means is unfolded, based on a time when an application execution object among the plurality of application execution objects displayed on the second displaying means is touched.

An Example 26 may be an electronic device in accordance with example 23 to example 25, or with any other example described herein, wherein the at least one displaying means include a first displaying means and a second displaying means displaying a plurality of application execution objects for executing the plurality of applications in a folded state of the first displaying means, and wherein the instructions are configured to enable the at least one processing means to deactivate the second displaying means upon detecting a switch of the first displaying means from the folded state to the unfolded state.

An Example 27 may be an electronic device in accordance with example 23 to example 26, or with any other example described herein, wherein the at least one displaying means include a first displaying means and a second displaying means displaying a plurality of application execution objects for executing the plurality of applications in a folded state of the first displaying means, and wherein the instructions are configured to enable the at least one processing means to determine a form in which a display area of the first displaying means is split, based on a touch-and-drag input on the second displaying means.

An Example 28 may be an electronic device in accordance with example 23 to example 27, or with any other example described herein, wherein the instructions are configured to enable the at least one processing means to obtain a first input to select a plurality of application execution objects in a first state in which at least part of the at least one displaying means is folded, obtain a second input to request to execute and display the plurality of applications, corresponding to the plurality of selected application execution objects, on the at least one displaying means, detect a switch from the first state to a second state in which the at least one displaying means is unfolded, split the second display area of the at least one displaying means to correspond to the number of the plurality of selected application execution objects, according to detecting the switch to the second state, execute and display the plurality of applications on the split second display area.

An Example 29 may be an electronic device in accordance with example 23 to example 28, or with any other example described herein, wherein the at least one displaying means include a first displaying means and a second displaying means displaying the application execution objects in the folded state of the first displaying means, wherein the instructions are configured to enable the at least one processing means to identify the first input based on touching one of the application execution objects displayed on the second displaying means for a predetermined time, and identify the second input based on moving the plurality of selected application execution objects to a designated position.

An Example 30 may be an electronic device in accordance with example 23 to example 29, or with any other example described herein, further comprising a first housing structure and a second housing structure, wherein the instructions are configured to enable the at least one processing means to identify that a state in which one surface of the first housing structure is disposed to face one surface of the second housing structure is the first state and identify that a state in which the first housing structure and the second housing structure are disposed to face in the same direction is the second state.

An Example 31 may be an electronic device in accordance with example 23 to example 30, or with any other example described herein, wherein the instructions are configured to enable the at least one processing means to store, in the at least one storage means, a layout of the plurality of applications displayed on the second display area.

An Example 32 may be an electronic device in accordance with example 23 to example 31, or with any other example described herein, wherein the instructions are configured to enable the at least one processing means to store, in the at least one storage means, information related to an angle at which the displaying means is folded, along with the layout of the plurality of applications displayed on the second display area.

An Example 33 may be an electronic device in accordance with example 23 to example 32, or with any other example described herein, wherein the instructions are configured to enable the at least one processing means to control the at least one displaying means in response to an external input to execute and display the plurality of applications according to the stored layout.

An Example 34 of the disclosure may be an operation method, wherein the operation method includes obtaining, through a first display area of at least one displaying means of the electronic device activated while the at least one displaying means is folded, an input to select a plurality of applications to be executed and displayed when the at least one displaying means is unfolded, detecting an unfolding of the at least one displaying means, based on the detection of the unfolding, split a second display area of the at least one displaying means activated while the at least one displaying means is unfolded to correspond to the number of the plurality of applications, and executing the plurality of applications and displaying the plurality of applications on the split second display area.

An Example 35 may be an operation method in accordance with example 34, or with any other example described herein, wherein the at least one displaying means includes a first displaying means and a second displaying means, the second displaying means displaying a plurality of application execution objects for executing the plurality of applications in a folded state of the first displaying means, and wherein the method of controlling the electronic device comprises determining an area, to display the plurality of applications, among a display area of the first displaying means when the first displaying means is unfolded, based on an order in which an application execution object among the plurality of application execution objects displayed on the second displaying means is selected.

An Example 36 may be an operation method in accordance with example 34 or example 35, or with any other example described herein, wherein the at least one displaying means includes a first displaying means and a second displaying means, the second displaying means displaying a plurality of application execution objects for executing the plurality of applications in a folded state of the first displaying means, and wherein the method of controlling the electronic device comprises determining an area, to display the plurality of applications, among a display area of the first displaying means when the first displaying means is unfolded, based on a time when an application execution object among the plurality of application execution objects displayed on the second displaying means is touched.

An Example 37 may be an operation method in accordance with example 34 to example 36, or with any other example described herein, wherein, wherein the at least one displaying means includes a first displaying means and a second displaying means, the second displaying means displaying a plurality of application execution objects for executing the plurality of applications in a folded state of the first displaying means, and wherein the method of controlling the electronic device comprises determining a form in which a display area of the first displaying means is split, based on a touch-and-drag input on the second displaying means.

An Example 38 of the disclosure may be an electronic device, wherein the electronic device may include a displaying means, at least part of the displaying means being folded, at least one processing means, and at least one storage means, wherein the at least one storage means stores instructions to, when executed, enable the at least one processing means to obtain an input to select a plurality of applications, in a folded state of the displaying means, store data related to the plurality of applications in a frame buffer included in the at least one storage means, based on the input, in the folded state of the displaying means, obtain an event in which the displaying means switches from the folded state to an unfolded state, and display the data stored in the frame buffer, related to the plurality of applications, through the displaying means, based on obtaining the event.

An Example 39 may be an electronic device in accordance with example 38, or with any other example described herein, wherein the at least processing means select the plurality of applications based on at least one of an order of the input to select the plurality of applications, a strength of the input, a direction of the input, or duration of the input.

An Example 40 may be an electronic device in accordance with example 38 or example 39, or with any other example described herein, wherein an attribute of the plurality of applications includes at least one of the number of the selected applications, a type of the selected application, or a display history of the selected application.

An Example 41 may be an electronic device in accordance with example 38 to example 40, or with any other example described herein, wherein the data obtained related to the plurality of applications is displayed on at least a portion of a display area of the displaying means split to correspond to the number of the plurality of applications.

An Example 42 of the disclosure may be an electronic device, wherein the electronic device may include at least one displaying means, at least one processing means, and at least one storage means, wherein the at least one storage means stores instructions to, when executed, enable the at least one processing means to obtain, through a display area activated while the at least one displaying means is folded, an input to determine a layout of a plurality of applications to be executed and displayed when the at least one displaying means is unfolded, obtain, through the display area, an input to select the plurality of applications to be executed and displayed when the at least one displaying means is unfolded, detect an unfolding of the at least one displaying means, and display the plurality of applications on the split display area according to the layout, based on the detection.

An Example 43 may be an electronic device in accordance with example 42, or with any other example described herein, wherein the instructions are configured to enable the at least one processing means to determine the layout to split the display area of the at least one displaying means, based on a touch-and-drag input on the activated display area.

An Example 44 may be an electronic device in accordance with example 42 or example 43, or with any other example described herein, wherein the at least one displaying means include a first displaying means and a second displaying means, the second displaying means displaying a plurality of application execution objects for executing the plurality of applications in a folded state of the first displaying means, and wherein the instructions are configured to enable the at least one processing means to determine the layout to split the display area of the first displaying means, based on a touch-and-drag input on the second displaying means.

Various embodiments as set forth herein may be implemented as software (e.g., the program 2440) including one or more instructions that are stored in a storage medium (e.g., internal memory 2436 or external memory 2438) that is readable by a machine (e.g., the electronic device 2401). For example, a processor (e.g., the processor 2420) of the machine (e.g., the electronic device 2401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

What is claimed is:

1. An electronic device comprising:
   at least one display;
   at least one processor; and
   at least one memory,
   wherein the at least one memory stores instructions configured to, when executed, enable the at least one processor to:
      based on the at least one display being folded, display, in a first display area of the at least one display, a plurality of application execution objects,
      while displaying the plurality of application execution objects in the first display area and the at least one display is folded, obtain an input selecting a plurality of applications among the plurality of application execution objects,
      after obtaining the input, detect an unfolding of the at least one display, and
      in response to the detecting of the unfolding of the at least one display, split a second display area of the at least one display into a number of regions corresponding to a number of the plurality of applications selected via the input, and display an execution screen of each of the plurality of applications in the number of regions, respectively, of the split second display area, and
   wherein the at least one display includes a flexible display.

2. The electronic device of claim 1,
   wherein the at least one display comprises a first display and a second display, the second display displaying the plurality of application execution objects for executing the plurality of applications while the first display is in a folded state, and
   wherein the instructions are further configured to enable the at least one processor to, based on an order in which application execution objects are selected, determine an area, among a display area of the first display, for displaying the execution screen of each of the plurality of applications selected via the input, when the first display is unfolded from the folded state to an unfolded state.

3. The electronic device of claim 1,
   wherein the at least one display comprises a first display and a second display, the second display displaying the plurality of application execution objects for executing the plurality of applications while the first display is in a folded state, and
   wherein the instructions are further configured to enable the at least one processor to, based on a time at which application execution objects are touched, determine an area, among a display area of the first display, for displaying the execution screen of each of the plurality of applications selected via the input when the first display is unfolded from the folded state to an unfolded state.

4. The electronic device of claim 1,
   wherein the at least one display comprises a first display and a second display, the second display displaying the plurality of application execution objects for executing the plurality of applications while the first display is in a folded state, and wherein the instructions are further configured to enable the at least one processor to, in response to detecting the first display being switched from the folded state to an unfolded state, deactivate the second display.

5. The electronic device of claim 1,
wherein the at least one display comprises a first display and a second display, the second display displaying the plurality of application execution objects for executing the plurality of applications while the first display is in a folded state, and
wherein the instructions are further configured to enable the at least one processor to, based on a touch-and-drag input on the second display, determine a form in which a display area of the first display is split.

6. The electronic device of claim 1, wherein the instructions are further configured to enable the at least one processor to:
obtain a first input selecting the plurality of application execution objects in a first state in which at least part of the at least one display is folded,
obtain a second input requesting to execute and display the plurality of applications corresponding to the plurality of selected application execution objects, respectively, on the at least one display,
detect a switch from the first state to a second state in which the at least one display is unfolded, and
in response to detecting the switch from the first state to the second state, split the second display area of the at least one display into a number of regions corresponding to a number of the plurality of selected application execution objects, and display the execution screen of each of the plurality of applications in the number of regions, respectively, of the split second display area.

7. The electronic device of claim 6,
wherein the at least one display comprises a first display and a second display, the second display displaying the application execution objects while the first display is in a folded state, and
wherein the instructions are further configured to enable the at least one processor to:
obtain the first input based on one of the application execution objects displayed on the second display being touched for a predetermined amount of time, and
obtain the second input based on the plurality of selected application execution objects being moved to a designated position.

8. The electronic device of claim 6, further comprising:
a first housing structure; and
a second housing structure,
wherein the instructions are further configured to enable the at least one processor to:
based on one surface of the first housing structure being disposed to face one surface of the second housing structure, identify the at least one display is in the first state, and
based on the one surface of the first housing structure and the one surface of the second housing structure being disposed to face a same direction, identify the at least one display is in the second state.

9. The electronic device of claim 6, wherein the instructions are further configured to enable the at least one processor to store, in the at least one memory, a layout of the plurality of applications displayed on the split second display area.

10. The electronic device of claim 9, wherein the instructions are further configured to enable the at least one processor to store, in the at least one memory, information related to an angle at which the at least one display is folded, along with the layout of the plurality of applications displayed on the split second display area.

11. The electronic device of claim 9, wherein the instructions are further configured to enable the at least one processor to, in response to an external input, display the execution screen of the plurality of applications according to the stored layout.

12. The electronic device of claim 1, wherein the number of regions, in which the execution screen of each of the plurality of applications are displayed, respectively, do not overlap each other on the split second display area.

13. A method of controlling an electronic device, the method comprising:
based on at least one display of the electronic device being folded, displaying, in a first display area of the at least one display, a plurality of application execution objects,
while displaying the plurality of application execution objects in the first display area and the at least one display is folded, obtaining an input selecting a plurality of applications among the plurality of application execution objects;
after obtaining the input, detecting an unfolding of the at least one display; and
in response to the detecting of the unfolding of the at least one display, splitting a second display area of the at least one display into a number of regions corresponding to a number of the plurality of applications selected via the input, and displaying an execution screen of each of the plurality of applications in the number of regions, respectively, of the split second display area,
wherein the at least one display includes a flexible display.

14. The method of claim 13,
wherein the at least one display comprises a first display and a second display, the second display displaying the plurality of application execution objects for executing the plurality of applications while the first display is in a folded state, and
wherein the method further comprises, based on an order in which application execution objects are selected, determining an area, among a display area of the first display, for displaying the execution screen of each of the plurality of applications selected via the input when the first display is unfolded from the folded state to an unfolded state.

15. The method of claim 13,
wherein the at least one display comprises a first display and a second display, the second display displaying the plurality of application execution objects for executing the plurality of applications while the first display is in a folded state, and
wherein the method further comprises, based on a time at which application execution objects are touched, determining an area, among a display area of the first display, for displaying the plurality of applications selected via the input when the first display is unfolded from the folded state to an unfolded state.

16. The method of claim 13,
wherein the at least one display comprises a first display and a second display, the second display displaying the plurality of application execution objects for executing the plurality of applications while the first display is in a folded state, and wherein the method further comprises, based on a touch-and-drag input on the second display, determining a form in which a display area of the first display is split.

\* \* \* \* \*